United States Patent
Inubushi et al.

(10) Patent No.: US 10,240,062 B2
(45) Date of Patent: *Mar. 26, 2019

(54) ANTISTATIC SHEET, AND PACKAGING MATERIAL AND ELECTRONIC DEVICE INCLUDING THE SAME

(71) Applicant: KURARAY CO., LTD., Kurashiki-shi (JP)

(72) Inventors: Yasutaka Inubushi, Kurashiki (JP); Ryoichi Sasaki, Kurashiki (JP); Yuji Shimizu, Kurashiki (JP); Masakazu Nakaya, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/503,132

(22) PCT Filed: Jul. 14, 2015

(86) PCT No.: PCT/JP2015/003565
§ 371 (c)(1),
(2) Date: Feb. 10, 2017

(87) PCT Pub. No.: WO2016/024382
PCT Pub. Date: Feb. 18, 2016

(65) Prior Publication Data
US 2017/0226367 A1 Aug. 10, 2017

(30) Foreign Application Priority Data
Aug. 13, 2014 (JP) ................. 2014-164646

(51) Int. Cl.
| | | |
|---|---|---|
| B32B 27/34 | (2006.01) | |
| B32B 27/32 | (2006.01) | |
| B32B 15/08 | (2006.01) | |
| B32B 15/20 | (2006.01) | |
| B32B 27/28 | (2006.01) | |
| B32B 27/06 | (2006.01) | |
| B32B 27/10 | (2006.01) | |
| B32B 27/08 | (2006.01) | |
| B32B 27/36 | (2006.01) | |
| C09D 133/02 | (2006.01) | |
| B32B 7/02 | (2006.01) | |
| B32B 9/00 | (2006.01) | |
| B65D 65/40 | (2006.01) | |
| B65D 81/24 | (2006.01) | |
| C01B 25/36 | (2006.01) | |
| B05D 3/00 | (2006.01) | |
| C09D 123/02 | (2006.01) | |
| C09D 123/04 | (2006.01) | |
| C09D 129/04 | (2006.01) | |
| C09D 185/02 | (2006.01) | |
| C08J 7/04 | (2006.01) | |

(52) U.S. Cl.
CPC ........... *C09D 133/02* (2013.01); *B05D 3/007* (2013.01); *B32B 7/02* (2013.01); *B32B 9/00* (2013.01); *B65D 65/40* (2013.01); *B65D 81/24* (2013.01); *C01B 25/36* (2013.01); *C08J 7/045* (2013.01); *C09D 123/02* (2013.01); *C09D 123/04* (2013.01); *C09D 129/04* (2013.01); *C09D 185/02* (2013.01); *C08J 2367/02* (2013.01); *C08J 2443/02* (2013.01)

(58) Field of Classification Search
None
See application file for complete search history.

(56) References Cited

U.S. PATENT DOCUMENTS

| | | | |
|---|---|---|---|
| 2001/0021741 A1* | 9/2001 | Yukawa | ............... C08F 230/02 524/441 |
| 2011/0122036 A1* | 5/2011 | Leung | ................. H01Q 9/0485 343/785 |
| 2011/0232726 A1 | 9/2011 | Aiba | |
| 2013/0034674 A1 | 2/2013 | Yoshida et al. | |
| 2015/0155409 A1 | 6/2015 | Nakaya et al. | |
| 2015/0373858 A1 | 12/2015 | Sasaki et al. | |
| 2017/0129216 A1 | 5/2017 | Shimizu et al. | |

FOREIGN PATENT DOCUMENTS

| | | |
|---|---|---|
| CN | 106660323 A | 5/2017 |
| JP | 2003-251732 A | 9/2003 |
| JP | 2005-8777 A | 1/2005 |
| JP | 2007-030387 A | 2/2007 |
| JP | 2011-5836 A | 1/2011 |
| JP | 2013-208794 A | 10/2013 |
| JP | 2013-258366 A | 12/2013 |
| TW | 201402341 | 4/2014 |

(Continued)

OTHER PUBLICATIONS

International Search Report dated Oct. 20, 2015 in PCT/JP2015/003565 filed Jul. 14, 2015.
Allred, A.L., "Electronegativity values from thermochemical data," Journal of Inorganic and Nuclear Chemistry, vol. 17, 1961, pp. 215-221.

*Primary Examiner* — Sheeba Ahmed
(74) *Attorney, Agent, or Firm* — Oblon, McClelland, Maier & Neustadt, L.L.P.

(57) ABSTRACT

The present invention provides a novel antistatic sheet having high gas barrier performance, high water vapor barrier performance, and antistatic performance, and a packaging material and an electronic device that include the antistatic sheet. The present invention relates to an antistatic sheet including a multilayer structure including a base (X), a layer (Z) containing an aluminum atom, and a layer (Y). The layer (Y) contains a polymer (A) having a vinylphosphonic acid unit, and the layer (Y) has a surface electrical resistivity of $1.0 \times 10^6$ $\Omega$/sq or more and $4.0 \times 10^{13}$ $\Omega$/sq or less.

8 Claims, 3 Drawing Sheets

(56) References Cited

FOREIGN PATENT DOCUMENTS

WO    2011/122036  A1    10/2011
WO    2014/122940  A1    8/2014

\* cited by examiner

ANTISTATIC SHEET, AND PACKAGING MATERIAL AND ELECTRONIC DEVICE INCLUDING THE SAME

TECHNICAL FIELD

The present invention relates to an antistatic sheet, and a packaging material and an electronic device that include the antistatic sheet.

BACKGROUND ART

Layered products in which a gas barrier layer containing aluminum or aluminum oxide as a component is formed on a plastic film have been conventionally well-known. Such layered products are used as packaging materials for protecting articles (such as foods) which are susceptible to quality change induced by oxygen. In many cases, such a gas barrier layer is formed on a plastic film by a dry process such as physical or chemical vapor deposition. Aluminum-deposited films have light shielding properties as well as gas barrier properties and are typically used as packaging materials for dry foods. Aluminum oxide-deposited films, which have transparency, are characterized by allowing visual recognition of contained substances and by enabling check for foreign matters with a metal detector and heating with a microwave oven. These films are thus used as packaging materials in a wide variety of applications such as retort food packaging.

For example, Patent Literature 1 discloses a gas barrier layer containing aluminum, the gas barrier layer being a transparent gas barrier layer composed of aluminum atoms, oxygen atoms, and sulfur atoms. Patent Literature 1 discloses a method for forming the transparent gas barrier layer by reactive sputtering.

Patent Literature 2 discloses a transparent gas barrier layer composed of a reaction product of aluminum oxide particles and a phosphorus compound. Patent Literature 2 discloses a method for forming the gas barrier layer, in which a coating liquid containing aluminum oxide particles and a phosphorus compound is applied onto a plastic film, then dried and heat-treated.

The conventional gas barrier layers have good gas barrier properties; however, many of these gas barrier layers have high surface electrical resistivities. It is difficult to use such a gas barrier layer having a high surface electrical resistivity in applications that require antistatic performance as well as gas barrier properties. When dried bonito shavings are put into a conventional vertical form-fill-seal bag, the powdery shavings contained in the bag adhere to the inner and outer surfaces of the bag due to static electricity, which may cause the shavings to be caught in a sealed portion or a sealer to be contaminated by the shavings during heat sealing. In addition, when the sealed bag is opened to remove the shavings, they cannot be removed smoothly from the bag, which causes the shavings to adhere to the periphery of the opening of the bag.

Patent Literature 3 discloses a gas-barrier in-mold label having an antistatic layer. Patent Literature 3 describes that the in-mold label has water vapor barrier properties. However, Patent Literature 3 fails to indicate whether or not the in-mold label has oxygen barrier properties.

CITATION LIST

Patent Literature

Patent Literature 1: JP 2003-251732 A
Patent Literature 2: WO 2011/122036 A1
Patent Literature 3: JP 2011-5836 A

SUMMARY OF INVENTION

Technical Problem

An object of the present invention is to provide: a novel antistatic sheet having high gas barrier performance, high water vapor barrier performance, and antistatic performance; and a packaging material and an electronic device that include the antistatic sheet.

Solution to Problem

Through a detailed study, the present inventors have found that an antistatic sheet including a multilayer structure including particular layers can achieve the above object and have completed the present invention.

The present invention provides an antistatic sheet including a multilayer structure including a base (X), a layer (Z) containing an aluminum atom, and a layer (Y). The layer (Y) contains a polymer (A) having a phosphonic acid unit, and the layer (Y) has a surface electrical resistivity of $1.0 \times 10^6$ $\Omega$/sq or more and $4.0 \times 10^{13}$ $\Omega$/sq or less.

In the antistatic sheet of the present invention, the polymer (A) having a phosphonic acid unit may be a polymer (Aa) having a vinylphosphonic acid unit.

In the antistatic sheet of the present invention, the multilayer structure may include at least one pair of the layer (Z) and the layer (Y) that are disposed contiguous to each other.

In the antistatic sheet of the present invention, the layer (Z) may include a layer (Z1) containing a reaction product (E). The reaction product (E) may be a reaction product formed by a reaction between a metal oxide (C) containing an aluminum atom and a phosphorus compound (D). In an infrared absorption spectrum of the layer (Z1), a maximum absorption wavenumber in a region of 800 to 1,400 $cm^{-1}$ may be 1,080 to 1,130 $cm^{-1}$.

In the antistatic sheet of the present invention, the layer (Z) may include a deposited layer (Z3) of aluminum oxide.

The antistatic sheet of the present invention may have an oxygen transmission rate of 2 mL/($m^2 \cdot$day$\cdot$atm) or less at 20° C. and 85% RH.

The present invention provides a packaging material. The packaging material includes the antistatic sheet of the present invention. The present invention provides an electronic device. The electronic device includes the antistatic sheet of the present invention.

Advantageous Effects of Invention

According to the present invention, it is possible to obtain an antistatic sheet having not only high gas barrier performance and water vapor barrier performance but also high antistatic performance. Thanks to its antistatic performance, the antistatic sheet of the present invention does not suffer from appearance defects caused by adhesion of fine powder to the surface of the sheet.

DESCRIPTION OF EMBODIMENTS

Figure 1:
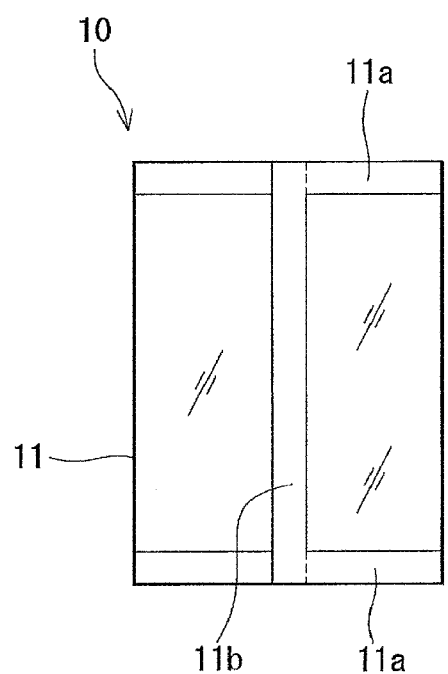
FIG. 1 is a schematic view showing an example of a vertical form-fill-seal bag according to the present invention.

Hereinafter, the present invention will be described with reference to examples. The following description gives examples of materials, conditions, techniques, and value ranges; however, the present invention is not limited to those mentioned as examples. The materials given as examples may be used alone or may be used in combination with one another, unless otherwise specified.

Unless otherwise specified, the meaning of an expression like "a particular layer is stacked on a particular member (such as a base or layer)" as used herein encompasses not only the case where the particular layer is stacked in direct contact with the member but also the case where the particular layer is stacked above the member, with another layer interposed therebetween. The same applies to expressions like "a particular layer is formed on a particular member (such as a base or layer)" and "a particular layer is disposed on a particular member (such as a base or layer)". Unless otherwise specified, the meaning of an expression like "a liquid (such as a coating liquid) is applied onto a particular member (such as a base or layer)" encompasses not only the case where the liquid is applied directly to the member but also the case where the liquid is applied to another layer formed on the member.

Herein, a layer may be termed "layer (Y)" using a reference character "(Y)" to differentiate the layer from other layers. The reference character "(Y)" has no technical meaning, unless otherwise specified. The same applies to other reference characters used in the terms such as "base (X)", "layer (Z)", and "polymer (A)". However, an exception is made for the terms such as "hydrogen atom (H)" in which the reference character obviously represents a specific element.

[Antistatic Sheet]

The antistatic sheet of the present invention may consist essentially of a multilayer structure. The antistatic sheet of the present invention has high gas barrier performance, high water vapor barrier performance, and antistatic performance as long as the multilayer structure includes a layer (Y), even if the layer (Y) is not the outermost layer of the multilayer structure. Therefore, the multilayer structure is not limited to a multilayer structure including a layer (Y) as the outermost layer.

[Multilayer Structure]

The multilayer structure of the present invention includes a base (X), a layer (Z) containing an aluminum atom, and a layer (Y). The term "multilayer structure" as used in the following description refers to a multilayer structure that includes the base (X), the layer (Z), and the layer (Y), unless otherwise specified. The layer (Y) contains a polymer (A) having a phosphonic acid unit. The layer (Y) has a surface electrical resistivity of $1.0 \times 10^6$ Ω/sq or more and $4.0 \times 10^{13}$ Ω/sq or less. In a preferred example, the layer (Y) is disposed as at least one surface of the multilayer structure.

[Base (X)]

The material of the base (X) is not particularly limited, and a base made of any of various materials can be used. Examples of the material of the base (X) include: resins such as thermoplastic resins and thermosetting resins; fiber assemblies such as fabrics and paper; wood; and glass. Among these, thermoplastic resins and paper are preferred. The base (X) in a preferred example includes at least one selected from the group consisting of a thermoplastic resin film layer and a paper layer. The base (X) may be a composite made of a plurality of materials and may be a single-layer or multilayer base.

The form of the base (X) is not particularly limited. The base (X) may be a laminar base such as a film or sheet or may be any of various formed bodies having a three-dimensional shape such as the shape of a sphere, polygon, or pipe. Among these, a laminar base is useful particularly when the multilayer structure (laminated structure) is used as or in a packaging material or solar cell member. The multilayer structure including such a base (X) is superior in terms of processability into a packaging material and various properties required for use as or in a packaging material.

Examples of thermoplastic resins that may be used in the base (X) include: polyolefin resins such as polyethylene and polypropylene; polyester resins such as polyethylene terephthalate, polyethylene-2,6-naphthalate, polybutylene terephthalate, and copolymers thereof; polyamide resins such as nylon-6, nylon-66, and nylon-12; hydroxy group-containing polymers such as polyvinyl alcohol and ethylene-vinyl alcohol copolymer; polystyrene; poly(meth)acrylate; polyacrylonitrile; polyvinyl acetate; polycarbonate; polyarylate; regenerated cellulose; polyimide; polyetherimide; polysulfone; polyethersulfone; polyetheretherketone; and ionomer resins. When the multilayer structure is used as or in a packaging material, the material of the base (X) is preferably at least one thermoplastic resin selected from the group consisting of polyethylene, polypropylene, polyethylene terephthalate, nylon-6, and nylon-66.

When a film made of such a thermoplastic resin is used as the base (X), the base (X) may be an oriented film or non-oriented film. In terms of high suitability for processes (such as suitability for printing or lamination) of the resulting multilayer structure, an oriented film, particularly a biaxially-oriented film, is preferred. The biaxially-oriented film may be a biaxially-oriented film produced by any one method selected from simultaneous biaxial stretching, sequential biaxial stretching, and tubular stretching.

Examples of the paper that may be used in the base (X) include kraft paper, high-quality paper, simili paper, glassine paper, parchment paper, synthetic paper, white paperboard, manila board, milk carton board, cup paper, and ivory paper. The use of paper in the base makes it possible to obtain a multilayer structure for a paper container.

When the base (X) is in the form of a layer, the thickness of the base (X) is preferably in the range of 1 to 1,000 μm, more preferably in the range of 5 to 500 μm, and even more preferably in the range of 9 to 200 μm, in terms of high mechanical strength and good processability of the resulting multilayer structure.

[Layer (Y)]

The layer (Y) contains a polymer (A) having a phosphonic acid unit. The polymer (A) that is a polymer contained in the layer (Y) and having a phosphonic acid unit may be referred to as a "polymer (A)" hereafter. The content of the polymer (A) in the layer (Y) may be in the range of 50 to 100 mass % (for example, 95 mass % or more) with respect to the mass (100 mass %) of the layer (Y).

[Polymer (A) Having Phosphonic Acid Unit]

The polymer (A) may consist only of phosphonic acid units or may contain an additional monomer unit. The proportion of phosphonic acid units in the total structural units of the polymer (A) may be in the range of 50 mol % to 100 mol % or in the range of 80 mol % to 100 mol %.

The polymer (A) is a polymer having a phosphonic acid unit, and preferably a homopolymer or a copolymer of an alkenylphosphonic acid. The alkenylphosphonic acid is a phosphonic acid having an alkenyl group as a substituent and represented by the following general formula [III].

$$R^5—P(=O)(OH)_2 \quad \quad [III]$$

In the formula, $R^5$ is an optionally substituted alkenyl group having 2 to 30 (e.g., 2 to 10) carbon atoms. The alkenyl group may include one or more oxycarbonyl groups in the molecular chain, and a part of the carbon chain may form a carbocyclic ring.

Examples of the alkenyl group include hydrocarbon chains having a carbon-carbon double bond (e.g., a vinyl group, an allyl group, a 1-propenyl group, an isopropenyl group, a 2-methyl-1-propenyl group, a 2-methyl-2-propenyl group, a 1-butenyl group, a 2-butenyl group, a 3-butenyl group, a 1-pentenyl group, a 1-hexenyl group, a 1,3-hexadienyl group, and 1,5-hexadienyl group). Examples of the carbocyclic ring in the alkenyl group include a benzene ring, a naphthalene ring, a cyclopropane ring, a cyclobutane ring, a cyclopentane ring, a cyclopropane ring, a cyclobutene ring, and a cyclopentene ring. In addition to the hydrocarbon chain having a carbon-carbon double bond in a carbocyclic ring, one or more saturated hydrocarbon chains (e.g., a methyl group, an ethyl group, and a propyl group) may be bonded.

Examples of the alkenylphosphonic acid monomer that can be suitably used in the present invention include: alkenylphosphonic acids such as vinylphosphonic acid and 2-propene-1-phosphonic acid; and alkenyl aromatic phosphonic acids such as 4-vinylbenzyl phosphonic acid and 4-vinylphenyl hosphonic acid. Among these, alkenylphosphonic acid is preferred and vinylphosphonic acid is more preferred.

The polymer (A) is preferably a polymer (Aa) having a vinylphosphonic acid unit. Examples of the polymer (Aa) include poly(vinylphosphonic acid) and vinylphosphonic acid-methacrylic acid copolymer. Among these, poly(vinylphosphonic acid) is preferred because it can contribute to obtaining high antistatic performance. The molecular weight of the polymer (A) is not particularly limited, and the number average molecular weight of the polymer (A) may be in the range of 5,000 to 100,000.

The polymer (A) can be obtained by polymerization of at least one monomer containing a phosphonic acid. The polymer (A) may be a copolymer of a phosphonic acid and another vinyl monomer. Examples of the other vinyl monomer copolymerizable with a phosphonic acid include (meth)acrylic acid, (meth)acrylic acid esters, acrylonitrile, methacrylonitrile, styrene, nuclear-substituted styrenes, alkyl vinyl ethers, alkyl vinyl esters, perfluoroalkyl vinyl ethers, perfluoroalkyl vinyl esters, maleic acid, maleic anhydride, fumaric acid, itaconic acid, maleimide, and phenylmaleimide. Among these, (meth)acrylic acid esters, acrylonitrile, styrene, maleimide, and phenylmaleimide are preferred.

The antistatic sheet of the present invention exhibits excellent properties because the layer (Y) present as the surface of the sheet has a surface electrical resistivity within a predetermined range. When the surface electrical resistivity of the layer (Y) is $1.0 \times 10^6$ Ω/sq or more and $4.0 \times 10^{13}$ Ω/sq or less, the antistatic sheet exhibits high antistatic performance. The surface electrical resistivity of the layer (Y) may be $1.0 \times 10^6$ Ω/sq or more and $3.0 \times 10^{12}$ Ω/sq or less.

In general, as the polarity of a molecule increases, the surface electrical resistance of a layer including the molecule decreases. In the case of a highly polar molecule, distribution of electric charges in the molecule is localized and the molecule is divided into a positively charged region and a negatively charged portion.

Therefore, a layer including such a highly polar molecule has high electrical conductivity and thus has low surface resistance. The reason why the use of the layer (Y) containing the polymer (A) having a phosphonic acid unit exhibits high antistatic performance is probably that the polymer (A) has high polarity.

In particular, when the layer (Y) is contiguous to the layer (Z), some of the phosphonic acid units in the polymer (A) react with aluminum atoms in the layer (Z), which may result in higher antistatic performance. The Pauling's electronegativities of a phosphorus atom, an oxygen atom, a hydrogen atom, and an aluminum atom are 2.29, 3.44, 2.20, and 1.61, respectively. The difference between the electronegativity of an oxygen atom and that of a hydrogen atom is 1.24, while the difference between the electronegativity of an oxygen atom and an aluminum atom is 1.83. This means that, when some of the phosphonic acid groups in the layer (Y) react with aluminum atoms in the layer (Z), the distribution of electric charges is further biased, resulting in higher electrical conductivity (that is, lower electrical resistance). Therefore, when the layer (Y) is contiguous to the layer (Z), particularly high antistatic performance can probably be obtained. The above-mentioned Pauling's electronegativities of various atoms are the values shown in Table 3 of the following Reference Document 1.

Reference Document 1: A. L. Allred, Journal of Inorganic and Nuclear Chemistry, vol. 17, pp. 215-221 (1961)

The mechanism by which the configuration of the present invention produces an antistatic effect has not yet been elucidated.

The surface electrical resistivity of the layer (Y) can be increased or reduced by the polarity of the molecules constituting the layer (Y). For example, the surface electrical resistivity of the layer (Y) can be increased by reducing the amount of phosphonic acid units in the polymer (A) or by adding a nonionic compound (such as polyvinyl alcohol) to the layer (Y). The surface electrical resistivity of the layer (Y) can be reduced by replacing the phosphonic acid in the polymer (A) by a phosphonate (such as sodium vinyl phosphonate) during polymerization of the polymer (A). The surface electrical resistivity of the layer (Y) can also be reduced by adding an ionic compound (such as a quaternary ammonium salt) to the layer (Y). Alternatively, the surface electrical resistivity of the layer (Y) can also be reduced by increasing the amount of phosphonic acid units in the polymer (A).

[Polymer (B)]

The layer (Y) may further contain the polymer (B). The polymer (B) has a hydroxyl group and/or a carboxyl group. Due to the presence of the layer (Y) containing the polymer (B), the antistatic sheet of the present invention can improve its adhesion to other layers. Typically, the polymer (B) is free of functional groups containing phosphorus atoms. In the layer (Y), the mass ratio between the polymer (A) and the polymer (B) is not particularly limited. The mass ratio may be in the range of 15:80 to 100:0 or in the range of 15:85 to 99:1. The mass ratio is preferably in the range of 20:80 to 99:1, more preferably in the range of 60:40 to 99:1, and even more preferably in the range of 50:50 to 85:15 or in the range of 55:45 to 75:25. When the mass ratio between the polymer (A) and the polymer (B) is in the above range, both antistatic performance and adhesion to other layers can be achieved.

Examples of the polymer (B) having a hydroxy group and/or carboxyl group include: polyvinyl alcohol-based polymers such as polyvinyl alcohol, modified polyvinyl alcohol containing 1 to 50 mol % of α-olefin units having 4 or less carbon atoms, and polyvinyl acetal (e.g., polyvinyl butyral); polysaccharides such as cellulose and starch; (meth)acrylic polymers such as polyhydroxyethyl (meth) acrylate, poly(meth)acrylic acid, and ethylene-(meth)acrylic acid copolymer; and maleic polymers such as a hydrolysate of ethylene-maleic anhydride copolymer, a hydrolysate of styrene-maleic anhydride copolymer, and a hydrolysate of isobutylene-maleic anhydride alternating copolymer. Among these, the polyvinyl alcohol-based polymers are preferred. More specifically, polyvinyl alcohol and modified polyvinyl alcohol containing 1 to 15 mol % of α-olefin units having 4 or less carbon atoms are preferred.

The polymer (B) may be a homopolymer of a monomer having a hydroxy group and/or a carboxyl group (e.g., acrylic acid) or a monomer capable of forming a hydroxy group and/or carboxyl group by further reaction (e.g., hydrolysis reaction) after polymerization (e.g., vinyl acetate or acrylic acid ester), may be a copolymer of two or more monomers, or may be a copolymer of a monomer having a hydroxy group and/or carboxyl group and a monomer having none of these groups. A mixture of two or more polymers (B) may be used as the polymer (B).

The molecular weight of the polymer (B) is not particularly limited. In order to obtain a multilayer structure that has better gas barrier properties and mechanical properties (e.g., drop impact resistance), the number average molecular weight of the polymer (B) is preferably 5,000 or more, more preferably 8,000 or more, and even more preferably 10,000 or more. The upper limit of the number average molecular weight of the polymer (B) is not particularly defined, and is, for example, 1,500,000 or less.

The layer (Y) may consist only of the polymer (A), may consist only of the polymer (A) and the polymer (B), or may further contain an additional component (e.g., an ionic compound). The content of the additional component in the layer (Y) is preferably 50 mass % or less, more preferably 20 mass % or less, even more preferably 10 mass % or less, and particularly preferably 5 mass % or less, and may be 0 mass % (which means that the additional component is not contained). Typically, the layer (Y) is free of aluminum atoms which are contained in the layer (Z). In other words, the typical layer (Y) differs from the layer (Z) by being substantially free of aluminum atoms which are contained in the layer (Z).

In terms of allowing the multilayer structure to maintain good appearance, the content of the polymer (B) in the layer (Y) is preferably 85 mass % or less, more preferably 50 mass % or less, even more preferably 20 mass % or less, and particularly preferably 10 mass % or less, with respect to the mass of the layer (Y) (defined as 100 mass %). The polymer (B) may or may not react with another component in the layer (Y).

It is preferable for the thickness of one layer (Y) to be 0.003 μm or more, in terms of better bending resistance of the multilayer structure of the present invention. The upper limit of the thickness of the layer (Y) is not particularly defined; however, the improving effect on bending resistance reaches a plateau when the thickness of the layer (Y) exceeds 1.0 μm. Hence, it is preferable to set the upper limit of the (total) thickness of the layer(s) (Y) to 1.0 μm for economical reasons. The thickness of the layer (Y) can be controlled depending on the concentration of the later-described coating liquid (S) used for forming the layer (Y) or the method for applying the liquid (S).

[Layer (Z)]

The multilayer structure of the present invention includes the layer (Z) containing aluminum atoms. It is preferable that the layer (Y) and the layer (Z) be stacked contiguous to (in contact with) each other. In other words, it is preferable that in the multilayer structure of the present invention, at least one pair of the layer (Z) and the layer (Y) be disposed contiguous to each other. In a preferred example, at least one pair of the layer (Y) and the layer (Z) are disposed in the order of "layer (Y)/layer (Z) from the surface of the multilayer structure.

The layer (Z) may be a layer (Z1) containing a reaction product (E) formed by a reaction between a metal oxide (C) containing an aluminum atom and a phosphorus compound (D). A compound formed by a reaction among the metal oxide (C), the phosphorus compound (D), and still another compound is also classified as the reaction product (E) herein. The layer (Z) may be a layer (Z2) that is a deposited layer of aluminum. The layer (Z) may be a deposited layer of an oxide containing an aluminum atom, or a layer (Z3) that is a deposited layer of aluminum oxide.

[Layer (Z1)]

Examples of the structure of the reaction product (E) contained in the layer (Z1) include a structure in which particles of the metal oxide (C) are bonded together via phosphorus atoms derived from the phosphorus compound (D). The forms in which the particles are bonded via phosphorus atoms include a form in which the particles are bonded via atomic groups containing a phosphorus atom, and examples of such a form include a form in which the particles are bonded via atomic groups containing a phosphorus atom and containing no metal atom. The layer (Z1) may partially contain the metal oxide (C) and/or phosphorus compound (D) that remains uninvolved in any reaction.

In the layer (Z1), the molar ratio between the metal atoms constituting the metal oxide (C) and the phosphorus atoms derived from the phosphorus compound (D), as expressed by [Metal atoms constituting metal oxide (C)]:[Phosphorus atoms derived from phosphorus compound (D)], is preferably in the range of 1.0:1.0 to 3.6:1.0, and more preferably in the range of 1.1:1.0 to 3.0:1.0. If the molar ratio falls outside such a range, the gas barrier performance deteriorates. The molar ratio in the layer (Z1) can be adjusted depending on the mixing ratio between the metal oxide (C) and the phosphorus compound (D) in a coating liquid for forming the layer (Z1). The molar ratio in the layer (Z1) is typically equal to that in the coating liquid.

In an infrared absorption spectrum of the layer (Z1), a maximum absorption wavenumber in the region of 800 to 1,400 $cm^{-1}$ is preferably 1,080 to 1,130 $cm^{-1}$. In the process in which the metal oxide (C) and the phosphorus compound (D) react to form the reaction product (E), a metal atom (M) derived from the metal oxide (C) and a phosphorus atom (P) derived from the phosphorus compound (D) are linked via an oxygen atom (O) to form a bond represented by M-O—P. As a result, a characteristic absorption band attributed to this bond appears in an infrared absorption spectrum of the reaction product (E). A study by the present inventors has revealed that the resulting multilayer structure exhibits good gas barrier properties when the characteristic absorption band attributed to the M-O—P bond is observed in the region of 1,080 to 1,130 $cm^{-1}$. It has been found that the resulting multilayer structure exhibits much better gas barrier properties particularly when the characteristic absorption band corresponds to the strongest absorption in the region of 800 to 1,400 $cm^{-1}$ where absorptions attributed to bonds between various atoms and oxygen atoms are generally observed.

By contrast, if a metal compound such as a metal alkoxide or metal salt and the phosphorus compound (D) are first mixed together and the mixture is then subjected to hydrolytic condensation, the resulting product is a composite material in which the metal atoms derived from the metal compound and the phosphorus atoms derived from the phosphorus compound (D) have been almost homogeneously mixed and reacted. In this case, in an infrared absorption spectrum of the composite material, the maximum absorption wavenumber in the region of 800 to 1,400 cm$^{-1}$ falls outside the range of 1,080 to 1,130 cm$^{-1}$.

In the infrared absorption spectrum of the layer (Z1), the half width of the maximum absorption band in the region of 800 to 1,400 cm$^{-1}$ is preferably 200 cm$^{-1}$ or less, more preferably 150 cm$^{-1}$ or less, even more preferably 100 cm$^{-1}$ or less, and particularly preferably 50 cm$^{-1}$ or less, in terms of the gas barrier properties of the resulting multilayer structure.

The infrared absorption spectrum of the layer (Z1) can be measured by the method described below in "EXAMPLES". If the measurement is not possible by the method described in "EXAMPLES", the measurement may be conducted by another method, examples of which include, but are not limited to: reflection spectroscopy such as reflection absorption spectroscopy, external reflection spectroscopy, or attenuated total reflection spectroscopy; and transmission spectroscopy such as Nujol method or pellet method performed on the layer (Z1) scraped from the multilayer structure.

The metal oxide (C) may be a hydrolytic condensate of a compound (G) containing the metal atom (M) to which a hydrolyzable characteristic group is bonded. Examples of the characteristic group include R$^1$ in the general formula (I) described later. The hydrolytic condensate of the compound (G) can be regarded substantially as a metal oxide. Thus, the hydrolytic condensate of the compound (G) may be referred to as "metal oxide (C)" herein. That is, the term "metal oxide (C)" as used herein is interchangeable with the term "hydrolytic condensate of the compound (G)", while the term "hydrolytic condensate of the compound (G)" as used herein is interchangeable with the term "metal oxide (C)".

The thickness of the layer (Z1) (or, for a multilayer structure including two or more layers (Z1), the total thickness of the layers (Z1)) is preferably in the range of 0.05 pin to 4.0 μm, and more preferably in the range of 0.1 μm to 2.0 μm. Thinning the layer (Z1) provides a reduction in the dimensional change that the multilayer structure can undergo during a process such as printing or lamination. Thinning the layer (Z1) also provides an increase in the flexibility of the multilayer structure, thus making it possible to allow the multilayer structure to have mechanical characteristics close to mechanical characteristics intrinsic to the base. When the multilayer structure of the present invention has two or more layers (Z1), it is preferable for the thickness of each layer (Z1) to be preferably 0.05 μm or more, in terms of the gas barrier properties. The thickness of the layer (Z1) can be controlled depending on the concentration of the later-described coating liquid (T) used for forming the layer (Z1) or the method for applying the liquid (T).

The thickness of the layer (Z1) can be measured by observing a cross-section of the multilayer structure with a scanning electron microscope or transmission electron microscope. The thicknesses of the layer (Y) and other layers can be measured in the same manner.

[Metal Oxide (C)]

The metal atoms constituting the metal oxide (C) (the metal atoms may be collectively referred to as "metal atoms (M)") include at least one metal atom selected from atoms of metals belonging to Groups 2 to 14 of the periodic table, and include at least aluminum atoms. The metal atoms (M) may consist of aluminum atoms alone or may include aluminum atoms and other metal atoms. A mixture of two or more metal oxides (C) may be used as the metal oxide (C).

The proportion of aluminum atoms in the metal atoms (M) is typically 50 mol % or more, and may be in the range of 60 mol % to 100 mol % or in the range of 80 mol % to 100 mol %. Examples of the metal oxide (C) include metal oxides produced by methods such as liquid-phase synthesis, gas-phase synthesis, and solid grinding.

[Compound (G)]

In terms of ease of control of the reaction and in terms of good gas barrier properties of the resulting multilayer structure, the compound (G) preferably includes at least one compound (G1) represented by the following general formula [I].

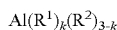

$$Al(R^1)_k(R^2)_{3-k} \quad [I]$$

In the formula, R$^1$ is a halogen atom (fluorine atom, chlorine atom, bromine atom, or iodine atom), NO$_3$, an optionally substituted alkoxy group having 1 to 9 carbon atoms, an optionally substituted acyloxy group having 2 to 9 carbon atoms, an optionally substituted alkenyloxy group having 3 to 9 carbon atoms, an optionally substituted β-diketonato group having 5 to 15 carbon atoms, or a diacylmethyl group having an optionally substituted acyl group having 1 to 9 carbon atoms. R$^2$ is an optionally substituted alkyl group having 1 to 9 carbon atoms, an optionally substituted aralkyl group having 7 to 10 carbon atoms, an optionally substituted alkenyl group having 2 to 9 carbon atoms, or an optionally substituted aryl group having 6 to 10 carbon atoms. k is an integer of 1 to 3. When there are two or more atoms or groups represented by R$^1$, the atoms or groups represented by R$^1$ may be the same as or different from each other. When there are two or more atoms or groups represented by R$^2$, the atoms or groups represented by R$^2$ may be the same as or different from each other.

The compound (G) may include, in addition to the compound (G1), at least one compound (G2) represented by the following general formula [II].

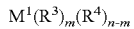

$$M^1(R^3)_m(R^4)_{n-m} \quad [II]$$

In the formula, M$^1$ is at least one metal atom different from an aluminum atom and selected from atoms of metals belonging to Groups 2 to 14 of the periodic table. R$^3$ is a halogen atom (fluorine atom, chlorine atom, bromine atom, or iodine atom), NO$_3$, an optionally substituted alkoxy group having 1 to 9 carbon atoms, an optionally substituted acyloxy group having 2 to 9 carbon atoms, an optionally substituted alkenyloxy group having 3 to 9 carbon atoms, an optionally substituted β-diketonato group having 5 to 15 carbon atoms, or a diacylmethyl group having an optionally substituted acyl group having 1 to 9 carbon atoms. R$^4$ is an optionally substituted alkyl group having 1 to 9 carbon atoms, an optionally substituted aralkyl group having 7 to 10 carbon atoms, an optionally substituted alkenyl group having 2 to 9 carbon atoms, or an optionally substituted aryl group having 6 to 10 carbon atoms. m is an integer of 1 to n. n is equal to the valence of M$^1$. When there are two or more atoms or groups represented by R$^3$, the atoms or groups represented by R$^3$ may be the same as or different from each other. When there are two or more atoms or groups represented by R$^4$, the atoms or groups represented by R$^4$ may be the same as or different from each other.

Examples of the alkoxy groups represented by $R^1$ and $R^3$ include methoxy, ethoxy, n-propoxy, isopropoxy, n-butoxy, isobutoxy, sec-butoxy, tert-butoxy, benzyloxy, diphenylmethoxy, trityloxy, 4-methoxybenzyloxy, methoxymethoxy, 1-ethoxyethoxy, benzyloxymethoxy, 2-trimethylsilylethoxy, 2-trimethylsilylethoxymethoxy, phenoxy, and 4-methoxyphenoxy groups.

Examples of the acyloxy groups represented by $R^1$ and $R^3$ include acetoxy, ethylcarbonyloxy, n-propylcarbonyloxy, isopropylcarbonyloxy, n-butylcarbonyloxy, isobutylcarbonyloxy, sec-butylcarbonyloxy, tert-butylcarbonyloxy, and n-octylcarbonyloxy groups.

Examples of the alkenyloxy groups represented by $R^1$ and $R^3$ include allyloxy, 2-propenyloxy, 2-butenyloxy, 1-methyl-2-propenyloxy, 3-butenyloxy, 2-methyl-2-propenyloxy, 2-pentenyloxy, 3-pentenyloxy, 4-pentenyloxy, 1-methyl-3-butenyloxy, 1,2-dimethyl-2-propenyloxy, 1,1-dimethyl-2-propenyloxy, 2-methyl-2-butenyloxy, 3-methyl-2-butenyloxy, 2-methyl-3-butenyloxy, 3-methyl-3-butenyloxy, 1-vinyl-2-propenyloxy, and 5-hexenyloxy groups.

Examples of the β-diketonato groups represented by $R^1$ and $R^3$ include 2,4-pentanedionato, 1,1,1-trifluoro-2,4-pentanedionato, 1,1,1,5,5,5-hexafluoro-2,4-pentanedionato, 2,2,6,6-tetramethyl-3,5-heptanedionato, 1,3-butanedionato, 2-methyl-1,3-butanedionato, 2-methyl-1,3-butanedionato, and benzoylacetonato groups.

Examples of the acyl groups of the diacylmethyl groups represented by $R^1$ and $R^3$ include aliphatic acyl groups having 1 to 6 carbon atoms such as formyl, acetyl, propionyl (propanoyl), butyryl (butanoyl), valeryl (pentanoyl), and hexanoyl groups; and aromatic acyl (aroyl) groups such as benzoyl and toluoyl groups.

Examples of the alkyl groups represented by $R^2$ and $R^4$ include methyl, ethyl, n-propyl, isopropyl, n-butyl, isobutyl, sec-butyl, tert-butyl, n-pentyl, isopentyl, n-hexyl, isohexyl, 3-methylpentyl, 2-methylpentyl, 1,2-dimethylbutyl, cyclopropyl, cyclopentyl, and cyclohexyl groups.

Examples of the aralkyl groups represented by $R^2$ and $R^4$ include benzyl and phenylethyl (phenethyl) groups.

Examples of the alkenyl groups represented by $R^2$ and $R^4$ include vinyl, 1-propenyl, 2-propenyl, isopropenyl, 3-butenyl, 2-butenyl, 1-butenyl, 1-methyl-2-propenyl, 1-methyl-1-propenyl, 1-ethyl-1-ethenyl, 2-methyl-2-propenyl, 2-methyl-1-propenyl, 3-methyl-2-butenyl, and 4-pentenyl groups.

Examples of the aryl groups represented by $R^2$ and $R^4$ include phenyl, 1-naphthyl, and 2-naphthyl groups.

Examples of the substituents in $R^1$, $R^2$, $R^3$, and $R^4$ include: alkyl groups having 1 to 6 carbon atoms; alkoxy groups having 1 to 6 carbon atoms such as methoxy, ethoxy, n-propoxy, isopropoxy, n-butoxy, isobutoxy, sec-butoxy, tert-butoxy, n-pentyloxy, isopentyloxy, n-hexyloxy, cyclopropyloxy, cyclobutyloxy, cyclopentyloxy, and cyclohexyloxy groups; alkoxycarbonyl groups having 1 to 6 carbon atoms such as methoxycarbonyl, ethoxycarbonyl, n-propoxycarbonyl, isopropoxycarbonyl, n-butoxycarbonyl, isobutoxycarbonyl, sec-butoxycarbonyl, tert-butoxycarbonyl, n-pentyloxycarbonyl, isopentyloxycarbonyl, cyclopropyloxycarbonyl, cyclobutyloxycarbonyl, and cyclopentyloxycarbonyl groups; aromatic hydrocarbon groups such as phenyl, tolyl, and naphthyl groups; halogen atoms such as fluorine, chlorine, bromine, and iodine atoms; acyl groups having 1 to 6 carbon atoms; aralkyl groups having 7 to 10 carbon atoms; aralkyloxy groups having 7 to 10 carbon atoms; alkylamino groups having 1 to 6 carbon atoms; and dialkylamino groups having an alkyl group having 1 to 6 carbon atoms.

It is preferable for $R^1$ to be a halogen atom, $NO_3$, an optionally substituted alkoxy group having 1 to 6 carbon atoms, an optionally substituted acyloxy group having 2 to 6 carbon atoms, an optionally substituted β-diketonato group having 5 to 10 carbon atoms, or a diacylmethyl group having an optionally substituted acyl group having 1 to 6 carbon atoms.

It is preferable for $R^2$ to be an optionally substituted alkyl group having 1 to 6 carbon atoms. In the formula [I], k is preferably 3.

It is preferable for $R^3$ to be a halogen atom, $NO_3$, an optionally substituted alkoxy group having 1 to 6 carbon atoms, an optionally substituted acyloxy group having 2 to 6 carbon atoms, an optionally substituted β-diketonato group having 5 to 10 carbon atoms, or a diacylmethyl group having an optionally substituted acyl group having 1 to 6 carbon atoms.

It is preferable for $R^4$ to be an optionally substituted alkyl group having 1 to 6 carbon atoms. It is preferable for $M^1$ to be an atom of a metal belonging to Group 4 of the periodic table, and more preferably a titanium or zirconium atom. When $M^1$ is an atom of a metal belonging to Group 4 of the periodic table, m in the formula [II] is preferably 4.

Boron and silicon are categorized as metals herein, although they may be classified as semimetals in other contexts.

Examples of the compound (G1) include aluminum chloride, aluminum nitrate, aluminum acetate, tris(2,4-pentanedionato)aluminum, trimethoxyaluminum, triethoxyaluminum, tri-n-propoxyaluminum, triisopropoxyaluminum, tri-n-butoxyaluminum, tri-sec-butoxyaluminum, and tri-tert-butoxyaluminum. Among these, triisopropoxyaluminum and tri-sec-butoxyaluminum are more preferred. A mixture of two or more compounds (G1) may be used as the compound (G).

Examples of the compound (G2) include: titanium compounds such as tetrakis(2,4-pentanedionato)titanium, tetramethoxytitanium, tetraethoxytitanium, tetraisopropoxytitanium, tetra-n-butoxytitanium, and tetrakis(2-ethylhexoxy)titanium; and zirconium compounds such as tetrakis(2,4-pentanedionato)zirconium, tetra-n-propoxyzirconium, and tetra-n-butoxyzirconium. These may be used alone or two or more compounds (G2) may be used in combination.

The proportion of the compound (G1) in the total amount of the compound (G) is not particularly limited as long as the effect of the present invention is obtained. The proportion of the compound (e.g., the compound (G2)) other than the compound (G1) in the total amount of the compound (G) is preferably 20 mol % or less, more preferably 10 mol % or less, and even more preferably 5 mol % or less, and may be 0 mol %, for example.

The compound (G) is hydrolyzed, so that at least some of the hydrolyzable characteristic groups of the compound (G) are converted to hydroxy groups. The hydrolysate is then condensed to form a compound in which the metal atoms (M) are linked together via an oxygen atom (O). The repetitions of this condensation results in the formation of a compound that can be substantially regarded as a metal oxide. In general, the thus formed metal oxide (C) has hydroxy groups present on its surface.

A compound is categorized as the metal oxide (C) herein when the ratio, [the number of moles of the oxygen atoms (O) bonded only to the metal atoms (M)]/[the number of moles of the metal atoms (M)], is 0.8 or more in the compound. The "oxygen atom (O) bonded only to the metal atom (M)", as defined herein, refers to the oxygen atom (O)

in the structure represented by M-O-M, and does not include an oxygen atom that is bonded to both the metal atom (M) and hydrogen atom (H) as is the case for the oxygen atom (O) in the structure represented by M-O—H. The above ratio in the metal oxide (C) is preferably 0.9 or more, more preferably 1.0 or more, and even more preferably 1.1 or more. The upper limit of this ratio is not particularly defined. When the valence of the metal atom (M) is denoted by n, the upper limit is typically expressed as n/2.

In order for the hydrolytic condensation to take place, it is important that the compound (G) has hydrolyzable characteristic groups. When there are no such groups bonded, hydrolytic condensation reaction does not occur or proceeds very slowly, which makes difficult the preparation of the metal oxide (C) intended.

The hydrolytic condensate of the compound (G) may be produced, for example, from a particular raw material by a technique employed in commonly-known sol-gel processes. As the raw material there can be used at least one selected from the group consisting of the compound (G), a partial hydrolysate of the compound (G), a complete hydrolysate of the compound (G), a compound formed by partial hydrolytic condensation of the compound (G), and a compound formed by condensation of a part of a complete hydrolysate of the compound (G).

The metal oxide (C) to be mixed with the phosphorus compound (D)-containing material (the phosphorus compound (D) itself or a composition containing the phosphorus compound (D)) is preferably substantially free of phosphorus atoms.

[Phosphorus Compound (D)]

The phosphorus compound (D) has a moiety capable of reacting with the metal oxide (C) and typically has two or more such moieties. In a preferred example, the phosphorus compound (D) contains 2 to 20 such moieties (atomic groups or functional groups). Examples of such moieties include a moiety capable of reacting with a functional group (e.g., hydroxy group) present on the surface of the metal oxide (C). Examples of such a moiety include a halogen atom bonded directly to a phosphorus atom and an oxygen atom bonded directly to a phosphorus atom. Such a halogen atom or oxygen atom is capable of undergoing condensation reaction (hydrolytic condensation reaction) with a hydroxy group present on the surface of the metal oxide (C). In general, the functional group (e.g., hydroxy group) present on the surface of the metal oxide (C) is bonded to the metal atom (M) constituting the metal oxide (C).

The phosphorus compound (D) used may be one that has a structure in which a halogen atom or oxygen atom is bonded directly to a phosphorus atom. Such a phosphorus compound (D) is capable of forming bonds with hydroxy groups present on the surface of the metal oxide (C) through (hydrolytic) condensation. The phosphorus compound (D) may have one phosphorus atom or may have two or more phosphorus atoms.

The phosphorus compound (D) may be at least one selected from the group consisting of: phosphorus oxoacids such as phosphoric acid, diphosphoric acid, triphosphoric acid, polyphosphoric acid formed by condensation of 4 or more molecules of phosphoric acid, phosphorous acid, phosphonic acid, phosphonous acid, phosphinic acid, and phosphinous acid; salts of these oxoacids (e.g., sodium phosphate); and derivatives of these oxoacids (e.g., halides such as phosphoryl chloride and dehydration products such as phosphorus pentoxide).

One of these phosphorus compounds (D) may be used alone or two or more thereof may be used in combination.

Among the above examples of the phosphorus compound (D), phosphoric acid is preferably used alone or in combination with another phosphorus compound (D). The use of phosphoric acid improves the stability of the coating liquid (T) described later and the gas barrier properties of the resulting multilayer structure.

The layer (Z1) may contain a particular polymer (F). The polymer (F) may be a polymer having at least one functional group selected from the group consisting of a hydroxy group, a carboxyl group, a carboxylic anhydride group, and a salt of a carboxyl group. For example, the polymer (F) may be any of the polymers mentioned as examples of the polymer (B). The layer (Z1) may further contain an additional component other than the polymer (F). Examples of the additional component include the substances mentioned as examples of the additional component that may be contained in the layer (Y). The content of the additional component in the layer (Z1) is preferably 50 mass % or less, more preferably 20 mass % or less, even more preferably 10 mass % or less, and particularly preferably 5 mass % or less.

[Inorganic Deposited Layer: Layer (Z2) and Layer (Z3)]

The multilayer structure may include an inorganic deposited layer. The inorganic deposited layer can be formed by vapor deposition of an inorganic substance. Examples of the inorganic substance include metals (such as aluminum), metal oxides (such as silicon oxide and aluminum oxide), metal nitrides (such as silicon nitride), metal oxynitrides (such as silicon oxynitride), and metal carbonitrides (such as silicon carbonitride). Among these, aluminum oxide, silicon oxide, magnesium oxide, and silicon nitride are preferred in that an inorganic deposited layer formed of any of these substances has good barrier properties against oxygen and water vapor. The layer (Z) in the multilayer structure of the present invention may be an inorganic deposited layer containing aluminum. For example, the layer (Z) may include a layer (Z2) that is a deposited layer of aluminum and/or a layer (Z3) that is a deposited layer of aluminum oxide. In an example, the layer (Z) is the layer (Z2) or layer (Z3).

The method for forming the inorganic deposited layer is not particularly limited, and available methods include: physical vapor deposition processes such as vacuum vapor deposition (e.g., resistive heating vapor deposition, electron beam vapor deposition, and molecular beam epitaxy), sputtering, and ion plating; and chemical vapor deposition processes such as thermal chemical vapor deposition (e.g., catalytic chemical vapor deposition), photochemical vapor deposition, plasma chemical vapor deposition (e.g., capacitively coupled plasma process, inductively coupled plasma process, surface wave plasma process, electron cyclotron resonance plasma process, and dual magnetron process), atomic layer deposition, and organometallic vapor deposition. The thickness of the inorganic deposited layer is preferably in the range of 0.002 to 0.5 µm, although the specific preferred thickness depends on the type of the component of the inorganic deposited layer. A thickness at which good barrier properties and mechanical properties of the multilayer structure are achieved can be selected within the above range. If the thickness of the inorganic deposited layer is less than 0.002 µm, the inorganic deposited layer tends to have a low ability to repeatedly exhibit the barrier properties against oxygen and water vapor, and the inorganic deposited layer may fail to exhibit sufficient barrier properties. If the thickness of the inorganic deposited layer is more than 0.5 µm, the barrier properties of the inorganic deposited layer are likely to deteriorate when the multilayer structure is pulled or bent. The thickness of the inorganic deposited layer is more preferably in the range of 0.005 to 0.2 µm, and even more preferably in the range of 0.01 to 0.1

[Method for Producing Multilayer Structure]

An example of the method for producing the multilayer structure of the present invention will be hereinafter described. The features described for the multilayer structure of the present invention can be applied to the following production method and may not be described repeatedly. The features described for the following production method can be applied to the multilayer structure of the present invention.

This production method is a method for producing a multilayer structure including a base (X), a layer (Z), and a layer (Y). This production method includes a layer (Y) formation step and a layer (Z) formation step. The layer (Y) formation step includes: a step (Y-i) of preparing a coating liquid (S) containing a polymer (A) and a solvent; and a step (Y-ii) of forming the layer (Y) on the base (X) using the coating liquid (S). The layer (Z) formation step will be described later. The coating liquid (S) may contain a polymer (B). In the case where the coating liquid (S) contains the polymer (B), the polymer (A) and the polymer (B) are mixed at a predetermined mass ratio in the step (Y-i). This results in the formation of the layer (Y) containing the polymer (A) and polymer (B) mixed at this ratio. The polymer (A), the polymer (B), and the mass ratio therebetween are as previously described, and will not be described repeatedly.

[Coating Liquid (S)]

The solvent used in the coating liquid (S) can be optionally selected depending on the types of the polymer (A) (and polymer (B)). The solvent is preferably water, an alcohol, or a mixed solvent thereof.

In terms of the storage stability of the coating liquid (S) and the gas barrier properties of the multilayer structure, the pH of the coating liquid (S) is preferably in the range of 0.1 to 6.0, more preferably in the range of 0.2 to 5.0, and even more preferably in the range of 0.5 to 4.0. The pH of the coating liquid (S) can be adjusted by a commonly-known method. For example, the pH can be adjusted by adding an acidic or basic compound to the coating liquid (S).

In the step (Y-ii), the layer (Y) is formed typically by applying the coating liquid (S) and then removing the solvent. The method for applying the coating liquid (S) is not particularly limited, and any commonly-known method can be employed. Examples of the application method include casting, dipping, roll coating, gravure coating, screen printing, reverse coating, spray coating, kiss coating, die coating, metering bar coating, chamber doctor-using coating, curtain coating, and bar coating.

The method for removing the solvent from the coating liquid (S) is not particularly limited, and any commonly-known drying method can be employed.

Examples of the drying method include hot air drying, hot roll contact drying, infrared heating, and microwave heating. The drying temperature is preferably 0 to 15° C. or more lower than the onset temperature of fluidization of the base (X).

[Layer (Z) Formation Step]

The production method of a multilayer structure includes a step of forming the layer (Z) containing aluminum atoms on the base (X). The layer (Z) formation step results in the multilayer structure including the layer (Z). Preferably, the layer (Z) and the layer (Y) are formed contiguous to each other.

The layer (Z) formation step may be performed at any time. For example, the layer (Z) formation step may be performed before the step (Y-i), after the step (Y-ii), or at any time between the steps (Y-i) and (Y-ii). It is preferable to perform the layer (Z) formation step before the step (Y-i). When the layer (Y) is to be disposed between the base (X) and the layer (Z), the layer (Z) formation step is performed after the step (Y-ii). When the layer (Z) is to be disposed between the base (X) and the layer (Y), the layer (Z) formation step is performed before the step (Y-ii). In this case, the coating liquid (S) is applied to the layer (Z) in the step (Y-ii).

When the layer (Z) is a layer (Z2) that is a deposited layer of aluminum or a layer (Z3) that is a deposited layer of aluminum oxide, the deposited layer can be formed by any of the common vapor deposition processes mentioned above. Thus, the following will describe the method for forming the layer (Z1) in detail. An example of the method for forming the layer (Z1) is described in JP 2013-208794 A.

When the layer (Z1) is to be formed, the layer (Z) formation step may include the steps (Z-i), (Z-ii), and (Z-iii). In the step (Z-i), a metal oxide (C), a phosphorus compound (D), and a solvent are mixed to prepare a coating liquid (T). In the step (Z-ii), the coating liquid (T) is applied onto the base (X) to form a precursor layer of the layer (Z1) on the base (X). In the step (Z-iii), the precursor layer is heat-treated at a temperature of 110° C. or higher to form the layer (Z1) on the base (X). The details of the steps (Z-i) to (Z-iii) will be described below.

The step (Z-i), step (Z-ii), step and step (Y-iii) are carried out typically in this order. However, when the layer (Y) is to be formed between the base (X) and the layer (Z1), the step (Y-ii) is carried out before the step (Z-ii) (may be carried out before the step (Z-i)). The step (Y-ii) may be carried out between the step (Z-ii) and the step (Z-iii). It is preferable to carry out the step (Y-ii) after the step (Z-iii) to allow the resulting multilayer structure to have good appearance.

[Step (Z-i)]

In the step (Z-i), the metal oxide (C), the phosphorus compound (D), and a solvent are at least mixed to prepare the coating liquid (T) containing them. From another standpoint, the metal oxide (C) and the phosphorus compound (D) are reacted in the solvent in the step (Z-i). Another compound (e.g., the polymer (F)) may be present with the metal oxide (C), phosphorus compound (D), and solvent when they are mixed.

[Dispersion of Metal Oxide (C)]

When the metal oxide (C) is aluminum oxide, the preparation of a dispersion of aluminum oxide is started by subjecting an aluminum alkoxide to hydrolytic condensation in an aqueous solution whose pH has optionally been adjusted by addition of an acid, thus giving a slurry of aluminum oxide. Next, the slurry is deflocculated in the presence of a certain amount of acid to obtain the dispersion of aluminum oxide. A dispersion of the metal oxide (C) containing an atom of a metal other than aluminum can be produced in the same manner.

Preferred examples of the acid catalyst used in hydrolytic condensation include hydrochloric acid, sulfuric acid, nitric acid, acetic acid, lactic acid, and butyric acid, among which nitric acid and acetic acid are more preferred. When an acid catalyst is used in hydrolytic condensation, it is preferable to use the acid catalyst in an appropriate amount depending on the type of the acid so that the pH falls within the range of 2.0 to 4.0 before the hydrolytic condensation.

The step (Z-i) preferably includes the following steps (Z-i-1) to (Z-i-3).

Step (Z-i-1): Step of preparing a dispersion (J) containing the metal oxide (C).

Step (Z-i-2): Step of preparing a solution (K) containing the phosphorus compound (D).

Step (Z-i-3): Step of mixing the dispersion (J) obtained in the step (Z-i-1) and the solution (K) obtained in the step (Z-i-2).

The step (Z-i-2) may be performed prior to the step (Z-i-1), simultaneously with the step (Z-i-1), or subsequent to the step (Z-i-1).

[Step (Z-i-1)]

In the step (Z-i-1), the dispersion (J) containing the metal oxide (C) is prepared. The dispersion (J) may be a dispersion of the metal oxide (C). The dispersion (J) can be prepared, for example, by mixing the compound (G), water, and optionally an acid catalyst and/or organic solvent and subjecting the compound (G) to condensation or hydrolytic condensation according to procedures employed in commonly-known sol-gel processes. The dispersion of the metal oxide (C) resulting from condensation or hydrolytic condensation of the compound (G) can be used per se as the dispersion (J) containing the metal oxide (C). The dispersion (J) may be subjected to a certain process (such as deflocculation as described above or addition or removal of the solvent for concentration control) as necessary. The solvent used in the step (Z-i-1) is not particularly limited. Preferred are: alcohols such as methanol, ethanol, and isopropanol; water; and mixed solvents thereof. The step (Z-i-1) may further include a step of subjecting at least one compound selected from the compound (G) and a hydrolysate of the compound (G) to condensation (e.g., hydrolytic condensation).

[Step (Z-i-2)]

In the step (Z-i-2), the solution (K) containing the phosphorus compound (D) is prepared. The solution (K) is prepared by dissolving the phosphorus compound (D) in a solvent. When the solubility of the phosphorus compound (D) is low, the dissolution may be promoted by heating or ultrasonication.

The solvent used in the preparation of the solution (K) may be selected as appropriate depending on the type of the phosphorus compound (D), and preferably contains water. The solvent may contain an organic solvent as long as the organic solvent does not hinder the dissolution of the phosphorus compound (D).

[Step (Z-i-3)]

In the step (Z-i-3), the dispersion (J) and the solution (K) are mixed. The coating liquid (T) may contain the polymer (F). The coating liquid (T) may contain at least one acid compound (Q) selected from acetic acid, hydrochloric acid, nitric acid, trifluoroacetic acid, and trichloroacetic acid, as necessary. The solution obtained in the step (Z-i-3) can be used per se as the coating liquid (T). In this case, the solvent contained in the dispersion (J) or in the solution (K) typically serves as the solvent of the coating liquid (T). Alternatively, the solution obtained in the step (Z-i-3) may be subjected to a process such as addition of an organic solvent, adjustment of the pH, or addition of an additive, and the resulting liquid may be used as the coating liquid (T).

The pH of the coating liquid (T) is preferably in the range of 0.1 to 6.0, more preferably in the range of 0.2 to 5.0, and even more preferably in the range of 0.5 to 4.0, in terms of the storage stability of the coating liquid (T) and the gas barrier properties of the multilayer structure. The pH of the coating liquid (T) can be adjusted by a commonly-known method, an example of which is to add an acidic or basic compound to the coating liquid (T).

[Step (Z-ii)]

In the step (Z-ii), the coating liquid (T) is applied onto the base (X) to form a precursor layer of the layer (Z1) on the base (X). The coating liquid (T) may be applied directly onto at least one surface of the base (X) or applied onto the base (X) with another layer interposed therebetween. An adhesive layer (L) may be formed on a surface of the base (X) by treating the surface of the base (X) with a commonly-known anchor coating agent or applying a commonly-known adhesive to the surface of the base (X) before application of the coating liquid (T). The coating liquid (T) may be applied to the layer (Y) formed on the base (X) in the step (Y-ii) to form the precursor layer of the layer (Z1) on the layer (Y).

The viscosity of the coating liquid (T) to be applied in the step (Z-ii) is preferably 3,000 mPa·s or less, and more preferably 2,000 mPa·s or less, as measured with a Brookfield rotational viscometer (SB-type viscometer: rotor No. 3, rotational speed=60 rpm) at a temperature at which the coating liquid (T) is applied. The viscosity of the coating liquid (S) is preferably 50 mPa·s or more, more preferably 100 mPa·s or more, and even more preferably 200 mPa·s or more. Adjusting the viscosity to 3,000 mPa·s or less improves the leveling of the coating liquid (T), thus allowing the resulting multilayer structure to have better appearance. The viscosity of the coating liquid (T) to be applied in the step (Z-ii) can be adjusted by changing the concentration and temperature of the coating liquid (T) and the time and intensity of the stirring performed after mixing in the step (Z-i-3). For example, long-time stirring following the mixing in the step (Z-i-3) may reduce the viscosity. The method for applying the coating liquid (T) onto the base (X) is not particularly limited, and any commonly-known method can be used. Examples of the application method include those which can be used to apply the coating liquid (S) in the step (Y-ii).

In the step (Z-ii), the precursor layer of the layer (Z1) is formed typically by removing the solvent from the coating liquid (T). The method for removing the solvent is not particularly limited, and any commonly-known drying method can be employed. Examples of the drying method include hot air drying, hot roll contact drying, infrared heating, and microwave heating. The drying temperature is preferably 0 to 15° C. or more lower than the onset temperature of fluidization of the base (X).

[Step (Z-iii)]

In the step (Z-III), the precursor layer (the precursor layer of the layer (Z1)) formed in the step (Z-ii) is heat-treated at a temperature of 110° C. or higher to form the layer (Z1).

In the step (Z-iii) a reaction takes place in which particles of the metal oxide (C) are bonded together via phosphorus atoms (phosphorus atoms derived from the phosphorus compound (D)). From another standpoint, a reaction of formation of the reaction product (E) takes place in the step (Z-iii). In order for the reaction to take place to a sufficient extent, the temperature of the heat treatment is preferably 110° C. or higher, more preferably 140° C. or higher, even more preferably 170° C. or higher, and particularly preferably 190° C. or higher. A lowered temperature of the heat treatment increases the time required to achieve a sufficient degree of reaction, and can cause a reduction in production efficiency. The preferred upper limit of the temperature of the heat treatment depends, for example, on the type of the base (X). For example, when a thermoplastic resin film made of polyamide resin is used as the base (X), the temperature of the heat treatment is preferably 190° C. or lower. When a thermoplastic resin film made of polyester resin is used as the base (X), the temperature of the heat treatment is preferably 220° C. or lower. The heat treatment may be performed, for example, in an air atmosphere, in a nitrogen atmosphere, or in an argon atmosphere.

The length of time of the heat treatment is preferably in the range of 0.1 seconds to 1 hour, more preferably in the range of 1 second to 15 minutes, and even more preferably in the range of 5 to 300 seconds.

The method for producing a multilayer structure may include a step of irradiating the layer (Z1) or the precursor layer of the layer (Z1) with ultraviolet light. The ultraviolet irradiation may be performed at any time after the step (Z-ii) (e.g., after the removal of the solvent from the applied coating liquid (T) is almost completed).

Treatment of a surface of the base (X) with a commonly-known anchor coating agent or application of a commonly-known adhesive onto a surface of the base (X) may be performed before the application of the coating liquid (T) to dispose the adhesive layer (L) between the base (X) and the layer (Z1).

The multilayer structure thus obtained can be used per se as the multilayer structure of the present invention. As described above, another member (e.g., an additional layer) may be adhered to or formed on the multilayer structure obtained as above, and the resulting multilayer structure may be used as the multilayer structure of the present invention. The adhering of the member can be done by a commonly-known method.

[Adhesive layer (L)]

In the multilayer structure of the present invention, the layer (Y) and/or layer (Z) may be stacked in direct contact with the base (X). Alternatively, the layer (Y) and/or layer (Z) may be stacked on the base (X) with another layer interposed therebetween. For example, the layer (Y) and/or layer (Z) may be stacked on the base (X) with the adhesive layer (L) interposed therebetween. This configuration may achieve enhanced adhesion between the base (X) and the layer (Y) and/or layer (Z). The adhesive layer (L) may be formed from an adhesive resin. The adhesive layer (L) made of an adhesive resin can be formed by treating a surface of the base (X) with a commonly-known anchor coating agent or by applying a commonly-known adhesive to a surface of the base (X). The adhesive is preferably a two-component reactive polyurethane adhesive containing a polyisocyanate component and a polyol component which are to be mixed and reacted. The addition of a small amount of additive such as a commonly-known silane coupling agent to the anchor coating agent or adhesive may further enhance the resulting adhesion. Examples of the silane coupling agent include, but are not limited to, silane coupling agents having a reactive group such as an isocyanate, epoxy, amino, ureido, or mercapto group. Strong adhesion between the base (X) and the layer (Y) and/or layer (Z) via the adhesive layer (L) makes it possible to more effectively prevent deterioration in the gas barrier properties and appearance of the multilayer structure of the present invention when the multilayer structure is subjected to a process such as printing or lamination, and also makes it possible to increase the drop impact resistance of a packaging material including the multilayer structure of the present invention. The thickness of the adhesive layer (L) may be in the range of 0.01 to 10 µm, and may be, for example, in the range of 0.01 to 5 µm, in the range of 0.01 to 1 µm, or in the range of 0.01 to 5.0

[Additional Layer]

The multilayer structure of the present invention may include an additional layer for imparting various properties such as heat-sealing properties or for improving the barrier properties or mechanical properties. Such a multilayer structure of the present invention can be produced, for example, by stacking the layer (Y) and layer (Z) on the base (X) directly or with the adhesive layer (L) interposed therebetween and then adhering or forming the additional layer on the layer (Y) or (Z) directly or with the adhesive layer (L) interposed therebetween. Examples of the additional layer include, but are not limited to, an ink layer and a polyolefin layer. This additional layer may be replaced by a formed body (e.g., a formed body having a three-dimensional shape) of the material thereof. The number of layers constituting the multilayer structure and the order of stacking the layers are not particularly limited. A preferred example of the multilayer structure has a structure in which at least one set of the base (X), the layer (Y), and the layer (Z) are stacked in the order of "base (X)/layer (Z)/layer (Y)".

The multilayer structure of the present invention may include an ink layer on which a product name or a decorative pattern is to be printed. Such a multilayer structure of the present invention can be produced, for example, by stacking the layer (Y) and layer (Z) on the base (X) directly or with the adhesive layer (L) interposed therebetween and then forming the ink layer directly on the layer (Y) or (Z). Examples of the ink layer include a film resulting from drying of a liquid prepared by dispersing a polyurethane resin containing a pigment (e.g., titanium dioxide) in a solvent. The ink layer may be a film resulting from drying of an ink or electronic circuit-forming resist containing a polyurethane resin free of any pigment or another resin as a main component. Methods that can be used to apply the ink layer onto the layer (Y) include gravure printing and various coating methods using a wire bar, a spin coater, or a die coater. The thickness of the ink layer is preferably in the range of 0.5 to 10.0 urn, and more preferably in the range of 1.0 to 4.0 µm.

The polymer (B) present in the layer (Y) has a hydroxy group and/or carboxyl group with high affinity to the adhesive layer (L) or additional layer (e.g., ink layer) and hence improves the adhesion between the layer (Y) and another layer. This can enable the multilayer structure to maintain interlayer adhesion after retorting and thus can prevent the multilayer structure from suffering from an appearance defect such as delamination.

Placing a polyolefin layer as an outermost layer of the multilayer structure of the present invention can impart heat-sealing properties to the multilayer structure or improve the mechanical characteristics of the multilayer structure. In terms of, for example, the impartation of heat-sealing properties and the improvement in mechanical characteristics, the polyolefin is preferably polypropylene or polyethylene. It is also preferable to stack at least one film selected from the group consisting of a film made of a polyester, a film made of a polyamide, and a film made of a hydroxy group-containing polymer, in order to improve the mechanical characteristics of the multilayer structure. In terms of the improvement in mechanical characteristics, the polyester is preferably polyethylene terephthalate, the polyamide is preferably nylon-6, and the hydroxy group-containing polymer is preferably ethylene-vinyl alcohol copolymer. Between the layers there may be an anchor coat layer or layer made of an adhesive provided as necessary.

A structure made up of the layer (Y) and layer (Z) stacked contiguously may hereinafter be referred to as a "layer (YZ)". The layer (Y) included in the layer (YZ) is typically disposed as the surface of the multilayer structure. Furthermore, a multilayer film including the base (X) and the layer (YZ) stacked on the base (X) may hereinafter be referred to as a "multilayer barrier film". This multilayer barrier film also is a type of the multilayer structure of the present invention. The multilayer structure of the present invention may include a polyolefin layer disposed as one of its surfaces and the layer (Y) disposed as the other surface.

[Configuration of Multilayer Structure]

Specific examples of the configuration of the multilayer structure of the present invention are listed below. In the following specific examples, each layer may be replaced by a formed body (e.g., a formed body having a three-dimensional shape) of the material thereof. The multilayer structure may have an adhesive layer such as the adhesive layer (L) or an additional layer; however, the adhesive layer or additional layer is omitted in the following specific examples.

(1) Layer (YZ)/polyester layer,
(2) Layer (YZ)/polyester layer/layer (YZ),
(3) Layer (YZ)/polyamide layer,
(4) Layer (YZ)/polyamide layer/layer (YZ),
(5) Layer (YZ)/polyolefin layer,
(6) Layer (YZ)/polyolefin layer/layer (YZ),
(7) Layer (YZ)/hydroxy group-containing polymer layer,
(8) Layer (YZ)/hydroxy group-containing polymer layer/layer (YZ),
(9) Layer (YZ)/paper layer,
(10) Layer (YZ)/paper layer/layer (YZ),
(11) Layer (YZ)/inorganic deposited layer/polyester layer,
(12) Layer (YZ)/inorganic deposited layer/polyamide layer,
(13) Layer (YZ)/inorganic deposited layer/polyolefin layer,
(14) Layer (YZ)/inorganic deposited layer/hydroxy group-containing polymer layer,
(15) Layer (YZ)/polyester layer/polyamide layer/polyolefin layer,
(16) Layer (YZ)/polyester layer/layer (YZ)/polyamide layer/polyolefin layer,
(17) Polyester layer/layer (YZ)/polyamide layer/polyolefin layer,
(18) Layer (YZ)/polyamide layer/polyester layer/polyolefin layer,
(19) Layer (YZ)/polyamide layer/layer (YZ)/polyester layer/polyolefin layer,
(20) Polyamide layer/layer (YZ)/polyester layer/polyolefin layer,
(21) Layer (YZ)/polyolefin layer/polyamide layer/polyolefin layer,
(22) Layer (YZ)/polyolefin layer/layer (YZ)/polyamide layer/polyolefin layer,
(23) Polyolefin layer/layer (YZ)/polyamide layer/polyolefin layer,
(24) Layer (YZ)/polyolefin layer/polyolefin layer,
(25) Layer (YZ)/polyolefin layer/layer (YZ)/polyolefin layer,
(26) Polyolefin layer/layer (YZ)/polyolefin layer,
(27) Layer (YZ)/polyester layer/polyolefin layer,
(28) Layer (YZ)/polyester layer/layer (YZ)/polyolefin layer,
(29) Polyester layer/layer (YZ)/polyolefin layer,
(30) Layer (YZ)/polyamide layer/polyolefin layer,
(31) Layer (YZ)/polyamide layer/layer (YZ)/polyolefin layer,
(32) Polyamide layer/layer (YZ)/polyolefin layer,
(33) Layer (YZ)/polyester layer/paper layer,
(34) Layer (YZ)/polyamide layer/paper layer,
(35) Layer (YZ)/polyolefin layer/paper layer,
(36) Polyolefin layer/paper layer/polyolefin layer/layer (YZ)/polyester layer/polyolefin layer,
(37) Polyolefin layer/paper layer/polyolefin layer/layer (YZ)/polyamide layer/polyolefin layer,
(38) Polyolefin layer/paper layer/polyolefin layer/layer (YZ)/polyolefin layer,
(39) Paper layer/polyolefin layer/layer (YZ)/polyester layer/polyolefin layer,
(40) Polyolefin layer/paper layer/layer (YZ)/polyolefin layer,
(41) Paper layer/layer (YZ)/polyester layer/polyolefin layer,
(42) Paper layer/layer (YZ)/polyolefin layer,
(43) Layer (YZ)/paper layer/polyolefin layer,
(44) Layer (YZ)/polyester layer/paper layer/polyolefin layer,
(45) Polyolefin layer/paper layer/polyolefin layer/layer (YZ)/polyolefin layer/hydroxy group-containing polymer layer,
(46) Polyolefin layer/paper layer/polyolefin layer/layer (YZ)/polyolefin layer/polyamide layer,
(47) Polyolefin layer/paper layer/polyolefin layer/layer (YZ)/polyolefin layer/polyester layer,
(48) Inorganic deposited layer/layer (YZ)/polyester layer,
(49) Inorganic deposited layer/layer (YZ)/polyester layer/layer (YZ)/inorganic deposited layer,
(50) Inorganic deposited layer/layer (YZ)/polyamide layer,
(51) Inorganic deposited layer/layer (YZ)/polyamide layer/layer (YZ)/inorganic deposited layer,
(52) Inorganic deposited layer/layer (YZ)/polyolefin layer,
(53) Inorganic deposited layer/layer (YZ)/polyolefin layer/layer (YZ)/inorganic deposited layer According to the present invention, it is possible to obtain a multilayer structure and an antistatic sheet that have an oxygen transmission rate of 2 mL/(m²·day·atm) or less at 20° C. and 85% RH. It is also possible to obtain a multilayer structure and an antistatic sheet that have a moisture permeability of 1.0 g/(m²/day) or less at 40° C. and 90% RH. The method and conditions for measurement of the oxygen transmission rate and the moisture permeability are as described later in "EXAMPLES".

[Applications]

The antistatic sheet of the present invention has both good gas barrier properties and high antistatic performance. The antistatic sheet of the present invention can therefore be used in various applications.

[Packaging Material]

The packaging material of the present invention includes the antistatic sheet of the present invention. A packaging material including the antistatic sheet of the present invention can be used in various applications. This packaging material is preferably used in applications that require antistatic performance in addition to barrier performance against oxygen and water vapor. For example, the packaging material according to the present invention is preferably used as a packaging material for powdery substances such as dried bonito shavings and red pepper powder. The packaging material according to the present invention can also be used preferably as a packaging material not only for foods but also for electronic components including ICs, transistors, diodes, capacitors, and piezoelectric element resistors.

The packaging material of the present invention can be fabricated by various methods without any particular limitation. For example, a container (packaging material) may be fabricated by subjecting an antistatic sheet or a film material including the antistatic sheet (such a material will hereinafter be simply referred to as "film material") to a joining process and thereby forming the sheet or the film material into a predetermined container shape. Examples of the method for shaping include thermoforming, injection molding, and extrusion blow molding. Alternatively, a container (packaging material) may be fabricated by forming the layer (Y) on the base (X) that has been formed in a predetermined container shape. A container thus fabricated may be referred to as a "packaging container" herein.

The packaging material including the antistatic sheet of the present invention may be used after being formed into any of various shaped products by secondary processing. Such a shaped product (packaging material) may be a vertical form-fill-seal bag, a vacuum packaging bag, a pouch, a laminated tube container, an infusion bag, a container lid, a paper container, or a vacuum insulator. These shaped products may be formed through heat sealing. In this case, airborne particles such as dust are less likely to adhere to the antistatic sheet of the present invention, and thus the airborne particles are less likely to be caught in a heat-sealed portion.

[Vertical Form-Fill-Seal Bag]

The packaging material of the present invention may be a vertical form-fill-seal bag. An example thereof is shown in FIG. 1. A vertical form-fill-seal bag 10 shown in FIG. 1 is formed by sealing an antistatic sheet 11 of the present invention at three portions, its two edge portions 11a and a body portion 11b. The vertical form-fill-seal bag 10 can be produced by a vertical form-fill-seal machine. Various methods can be employed for bag making by a vertical form-fill-seal machine. In any method, the substance to be contained in the bag is fed through the top opening of the bag into its interior, and the opening is then sealed to produce the vertical form-fill-seal bag. The vertical form-fill-seal bag is composed of, for example, one film material heat-sealed at three portions, its upper edge, lower edge, and side. The vertical form-fill-seal bag as the packaging container according to the present invention has good gas barrier properties and water vapor barrier properties. In addition, dust or the like is less likely to adhere to the surface of the sheet to be bonded during bag making. The use of the vertical form-fill-seal bag can therefore prevent quality degradation of the contained substance over a long period of time.

[Pouch]

Figure 2:
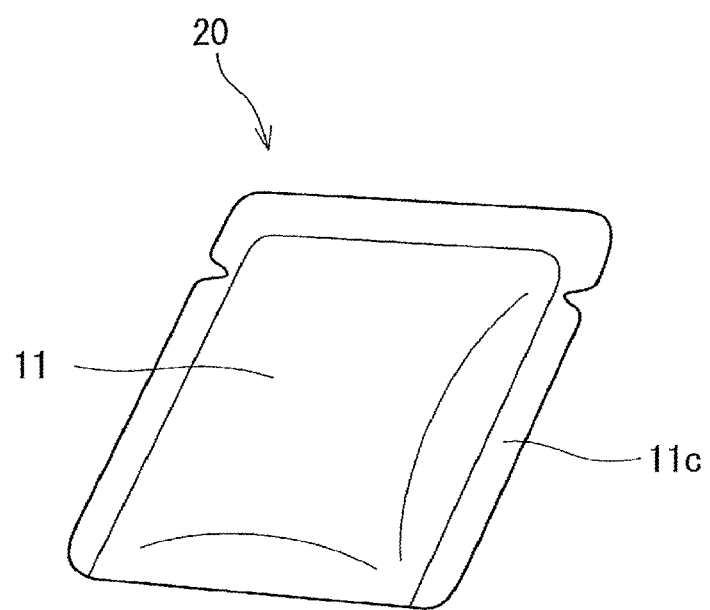
FIG. 2 is a schematic view showing an example of a flat pouch according to the present invention.

The packaging material of the present invention may be a pouch. An example is shown in FIG. 2. A flat pouch 20 of FIG. 2 is formed of two antistatic sheets 11 joined together at their edges 11c. The term "pouch" as used herein generally refers to a container including a film material as a barrier member and intended to contain a food, a daily commodity, or a medical product. Pouches can have various shapes and applications, and examples include a spouted pouch, a zippered pouch, a flat pouch, a stand-up pouch, a horizontal form-fill-seal pouch, and a retort pouch. Such a pouch may be formed by stacking a multilayer barrier film and at least another layer together. The pouch as the packaging container according to the present invention has good gas barrier properties and water vapor barrier properties. In addition, dust or the like is less likely to adhere to the surface of the sheet to be bonded during bag making. The use of the pouch can therefore prevent quality degradation of the contained substance over a long period of time. An example of the pouch can hold good transparency, which allows easy identification of the contained substance and easy check for change in the quality of the contained substance caused by degradation.

[Vacuum Insulator]

A vacuum insulator is a heat insulator including a sheath material and a core material disposed in an interior bounded by the sheath material, and the interior in which the core material is disposed has a reduced pressure. A vacuum insulator thinner and lighter than an insulator made of urethane foam can provide heat insulating properties comparable to the heat insulating properties provided by the urethane foam insulator. The vacuum insulator of the present invention is capable of maintaining the heat-insulating effect over a long period of time and can therefore be used for heat insulation, for example, as or in: a heat insulating material for home electric appliances such as refrigerators, hot-water supply systems, and rice cookers; a residential heat insulating material used in walls, ceilings, attics, floors, etc.; a vehicle roof member; an insulating panel for automatic vending machines etc.; and a heat transfer apparatus such as an apparatus employing a heat pump.

Figure 3:
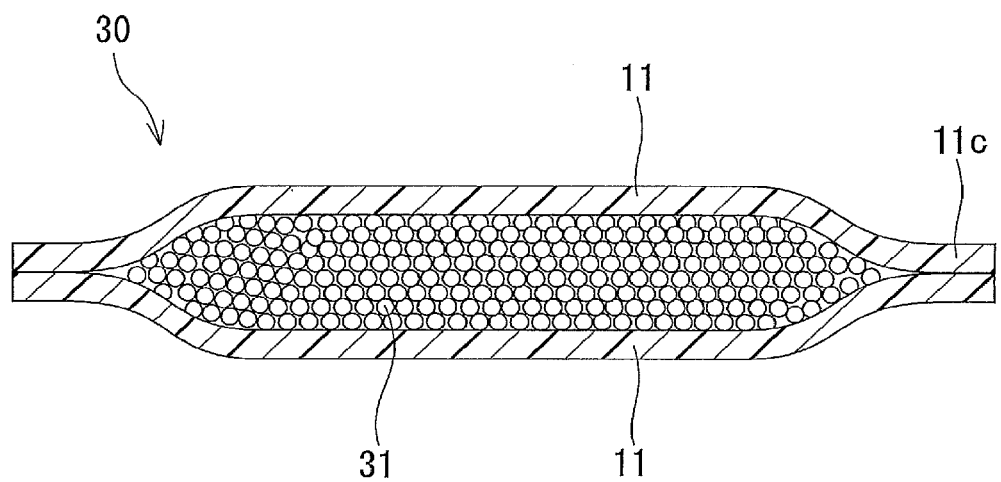
FIG. 3 is a schematic view showing an example of a vacuum insulator according to the present invention.

An example of the vacuum insulator according to the present invention is shown in FIG. 3. A vacuum insulator 30 of FIG. 3 includes a sheath material 11 and a core material 31 in the form of particles. The sheath material 11 is constituted by two film materials joined together at their edges 11c, and the core material 31 is disposed in an interior bounded by the sheath material 11. In the central portion bounded by the edges 11c, the sheath material 11 functions as a separation barrier separating the interior containing the core material 31 from the outside and, due to pressure difference between the interior and the outside, is in close contact with the core material 31.

The material and form of the core material are not particularly limited as long as they are adapted for heat insulation. Examples of the core material include a perlite powder, a silica powder, a precipitated silica powder, diatomite, calcium silicate, glass wool, rockwool, artificial (synthetic) wool, and foamed resins (such as styrene foam and urethane foam). A hollow container or a honeycomb structure formed in a predetermined shape can also be used as the core material.

[Electronic Device]

Figure 4:
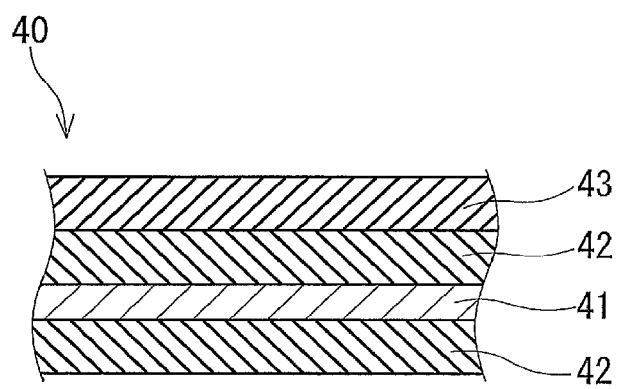
FIG. 4 is a cross-sectional view showing a part of an example of an electronic device according to the present invention.

An example of an electronic device having the antistatic sheet of the present invention will now be described. A partial cross-sectional view of the electronic device is shown in FIG. 4. An electronic device 40 of FIG. 4 includes an electronic device body 41, sealing materials 42 for sealing the electronic device body 41, and a protective sheet (antistatic sheet) 43 for protecting the surface of the electronic device body 41. The sealing material 42 covers the entire surface of the electronic device body 41. The protective sheet 43 is disposed over one side of the electronic device body 41, with the sealing material 42 interposed therebetween. On the side opposite to that on which the protective sheet 43 is disposed there may be disposed another protective sheet 43. In this case, the protective sheet disposed on the opposite side may be the same as or different from the protective sheet 43.

The electronic device body 41 is not particularly limited and is, for example, a photoelectric conversion device such as a solar cell, an information display device such as an organic EL display, liquid crystal display, or electronic paper, or a lighting device such as an organic EL light-emitting element. The sealing material 42 is an optional member that can be added as appropriate depending on, for example, the type and use of the electronic device body 41. Examples of the sealing material 42 include ethylene-vinyl acetate copolymer and polyvinyl butyral. It suffices for the protective sheet 43 to be disposed in such a manner as to protect the surface of the electronic device body 41. The protective sheet 43 may be disposed directly on the surface of the electronic device body 41 or may be disposed over the surface of the electronic device body 41, with another member such as the sealing material 42 being interposed therebetween.

A preferred example of the electronic device body 41 is a solar cell. Examples of the solar cell include a silicon solar cell, a compound semiconductor solar cell, and an organic thin-film solar cell. Examples of the silicon solar cell include a monocrystalline silicon solar cell, a polycrystalline silicon solar cell, and an amorphous silicon solar cell. Examples of the compound semiconductor solar cell include a III-V compound semiconductor solar cell, a II-VI compound semiconductor solar cell, and a I-III-VI compound semiconductor solar cell.

Examples of the organic thin-film solar cell include a p-n heterojunction organic thin-film solar cell and a bulk heterojunction organic thin-film solar cell. The solar cell may or may not be an integrated solar cell including a plurality of unit cells connected in series.

Depending on the type of the electronic device body 41, it can be fabricated by a so-called roll-to-roll process. In the roll-to-roll process, a flexible substrate (e.g., a stainless steel substrate or a resin substrate) wound around a feed roll is delivered from the feed roll, an element is formed on this substrate to fabricate the electronic device body 41, and the electronic device body 41 is wound on a take-up roll. In this case, it is advantageous that the protective sheet 43 be prepared beforehand in the form of a flexible long sheet, more particularly in the form of a wound roll of the long sheet. In an example, the protective sheet 43 delivered from a feed roll is stacked onto the electronic device body 41 that has yet to be wound on the take-up roll and is wound up together with the electronic device body 41. In another example, the electronic device body 41 that has been wound on the take-up roll once may be fed from the roll again and stacked onto the protective sheet 43. In a preferred example of the present invention, the electronic device per se has flexibility.

The protective sheet 43 includes the antistatic sheet of the present invention. The antistatic sheet may consist only of the multilayer structure. Alternatively, the antistatic sheet may include the multilayer structure and another member (e.g., an additional layer) stacked on the multilayer structure. The thickness and material of the protective sheet 43 are not particularly limited, as long as the sheet is a sheet of layered product suitable for protection of a surface of an electronic device and includes the antistatic sheet described above.

The transparent antistatic sheet of the present invention can be obtained when the antistatic sheet is composed of a transparent base and transparent layers. The antistatic sheet of the present invention has high barrier performance against oxygen and water vapor and, in addition, has antistatic performance. These properties can be highly beneficial to the durability of a product fabricated using the antistatic sheet of the present invention, particularly when the product is a solar cell member or display member.

The protective sheet 43 may, for example, include a surface protection layer disposed on one or both of the surfaces of the antistatic sheet. It is preferable for the surface protection layer to be a layer made of a scratch-resistant resin. A surface protection layer for a device such as a solar cell which may be used outdoors is preferably made of a resin having high weather resistance (e.g., light resistance). For protecting a surface required to permit transmission of light, a surface protection layer having high light transmittance is preferred. Examples of the material of the surface protection layer (surface protection film) include poly(meth)acrylic acid ester, polycarbonate, polyethylene terephthalate, polyethylene-2,6-naphthalate, polyvinyl fluoride (PVF), polyvinylidene fluoride (PVDF), polytetrafluoroethylene (PTFE), polychlorotrifluoroethylene (PCTFE), ethylene-tetrafluoroethylene copolymer (ETFE), ethylene-chlorotrifluoroethylene copolymer (ECTFE), tetrafluoroethylene-perfluoroalkyl vinyl ether copolymer (PFA), and tetrafluoroethylene-hexafluoropropylene copolymer (FEP). In an example, the protective sheet includes a poly(meth)acrylic acid ester layer disposed on one of its surfaces.

An additive (e.g., an ultraviolet absorber) may be added to the surface protection layer to increase the durability of the surface protection layer. A preferred example of the surface protection layer having high weather resistance is an acrylic resin layer to which an ultraviolet absorber has been added. Examples of the ultraviolet absorber include, but are not limited to, ultraviolet absorbers based on benzotriazole, benzophenone, salicylate, cyanoacrylate, nickel, or triazine. In addition, another additive such as a stabilizer, light stabilizer, or antioxidant may be used in combination.

The present invention encompasses embodiments obtainable by combining the above features in various manners within the technical scope of the present invention as long as such embodiments exert the effect of the present invention.

EXAMPLES

Hereinafter, the present invention will be described in more detail by way of examples. The present invention is not limited by these examples in any respect, and it should be understood that many modifications can be made by any ordinarily skilled person in the art within the technical concept of the present invention. Analysis and evaluation in Examples and Comparative Examples given below were performed as will now be described. In the analysis and evaluation in Comparative Examples, the layer (Y) may be interchanged with the layer (CY).

(1) Measurement of Infrared Absorption Spectrum

The measurement was performed by attenuated total reflection spectroscopy using a Fourier transform infrared spectrophotometer. The measurement conditions were as follows.

Apparatus: Spectrum One, manufactured by PerkinElmer, Inc.

Measurement mode: Attenuated total reflection spectroscopy Measurement range: 800 to 1,400 $cm^{-1}$ (2) Measurement of Respective Thicknesses of Layers Each multilayer structure was cut using a focused ion beam (FIB) to prepare a section (thickness: 0.3 μm) for cross-sectional observation. The prepared section was secured to a sample stage with a carbon tape and subjected to platinum ion sputtering at an accelerating voltage of 30 kV for 30 seconds. The cross-section of the multilayer structure was observed using a field-emission transmission electron microscope to determine the respective thicknesses of the layers. The measurement conditions were as follows.

Apparatus: JEM-2100F, manufactured by JEOL Ltd.
Accelerating voltage: 200 kV
Magnification: ×250,000

(3) Measurement of Oxygen Transmission Rate

A multilayer structure was set to an oxygen transmission rate measurement apparatus in such a manner that the layer as the base faced the carrier gas side, and the oxygen transmission rate was measured. The measurement conditions were as follows.

Apparatus: MOCON OX-TRAN 2/20, manufactured by ModernControls, Inc.
Temperature: 20° C.
Humidity on oxygen feed side: 85% RH
Humidity on carrier gas side: 85% RH
Oxygen pressure: 1 atmosphere
Carrier gas pressure: 1 atmosphere
(4) Measurement of Moisture Permeability A multilayer structure was set to a water vapor transmission rate measurement apparatus in such a manner that the layer as the base faced the carrier gas side, and the moisture permeability (water vapor transmission rate) was measured. The measurement conditions were as follows.
Apparatus: MOCON PERMATRAN 3/33, manufactured by ModernControls, Inc.
Temperature: 40° C.
Humidity on water vapor feed side: 90% RH
Humidity on carrier gas side: 0% RH
(5) Measurement of Surface Electrical Resistivity A predetermined electrode was brought into contact with a surface of a multilayer structure opposite to the surface on the base (X) side, and the electrode was connected to a digital ultrahigh-resistance/minute-current ammeter. A voltage was applied between a main electrode and a guard electrode and the surface electrical resistance of the layers (Y) and the surface layers of Comparative Examples was measured according to JIS K 6911 (2006) and JIS C 2139 (2008). The measurement conditions were as follows. The values of the surface electrical resistance thus obtained were each multiplied by a correction factor of 18.84 to calculate the surface electrical resistivity.
Apparatus: R8340A, manufactured by Advantest Corporation
Temperature: 20° C.
Voltage: 500 V
Diameter of main electrode: 50 mm
Inner diameter of guard electrode: 70 mm
(6) Adhesion of Dust Flour was applied to the surface of each multilayer structure, and then a blast of air was blown to the surface to remove the flour from the surface. After the removal of the flour, evaluation was made based on the state of the surface according to the following criteria. Specifically, the surface with no flour adhered was rated A, the surface with traces of flour adhered was rated B, and the surface with a large amount of flour adhered was rated C.

<Production Example of Coating Liquid (T-1)>

Distilled water in an amount of 230 parts by mass was heated to 70° C. under stirring. Triisopropoxyaluminum in an amount of 88 parts by mass was added dropwise to the distilled water over 1 hour, the liquid temperature was gradually increased to 95° C., and isopropanol generated was distilled off. In this manner, hydrolytic condensation was performed. To the resulting liquid was added 4.0 parts by mass of a 60 mass % aqueous nitric acid solution, and this was followed by stirring at 95° C. for 3 hours to deflocculate agglomerates of particles of the hydrolytic condensate. After that, the liquid was concentrated so that it had a solids concentration of 10 mass % in terms of aluminum oxide. To 18.66 parts by mass of the thus obtained dispersion were added 58.19 parts by mass of distilled water, 19.00 parts by mass of methanol, and 0.50 parts by mass of a 5 mass % aqueous polyvinyl alcohol solution (PVA 124, manufactured by KURARAY CO., LTD.; degree of saponification=98.5 mol %, viscosity-average degree of polymerization=2,400, viscosity of 4 mass % aqueous solution at 20° C.=60 mPa·s). This was followed by stirring to obtain a homogeneous dispersion. Subsequently, 3.66 parts by mass of an 85 mass % aqueous phosphoric acid solution was added dropwise to the dispersion under stirring, with the liquid temperature held at 15° C. The stirring was continued at 15° C. until a viscosity of 1,500 mPa·s was reached, and the intended coating liquid (T-1) was thus obtained. In the coating liquid (T-1), the molar ratio between aluminum atoms and phosphorus atoms, as expressed by aluminum atoms=phosphorus atoms, was 1.15=1.00.

<Synthesis Example of Polymer (A-1)>

Under nitrogen atmosphere, 10 g of vinylphosphonic acid and 0.025 g of 2,2'-azobis(2-amidinopropane) dihydrochloride were dissolved in 5 g of water, and the resulting solution was stirred at 80° C. for 3 hours. After being cooled, the polymer solution was diluted by the addition of 15 g of water and then filtered using "Spectra/Por" (registered trademark), a cellulose membrane manufactured by Spectrum Laboratories, Inc. Water was removed from the filtrate by distillation, followed by vacuum drying at 50° C. for 24 hours to obtain a polymer (A-1). The polymer (A-1) was poly(vinylphosphonic acid). As a result of GPC analysis, the number average molecular weight of the polymer was determined to be 10,000 on a polyethylene glycol-equivalent basis.

<Synthesis Example of Polymer (A-2)>

Under nitrogen atmosphere, 9.5 g of vinylphosphonic acid, 0.40 g of methacrylic acid, and 0.025 g of 2,2'-azobis(2-amidinopropane) dihydrochloride were dissolved in 5 g of water, and the resulting solution was stirred at 80° C. for 3 hours. After being cooled, the polymer solution was diluted by the addition of 15 g of water and then filtered using "Spectra/Por" (registered trademark), a cellulose membrane manufactured by Spectrum Laboratories, Inc. Water was removed from the filtrate by distillation, followed by vacuum drying at 50° C. for 24 hours to obtain a polymer (A-2). The polymer (A-2) was a copolymer of vinylphosphonic acid and methacrylic acid (a molar ratio, vinylphosphonic acid=methacrylic acid, 95:5). As a result of GPC analysis, the number average molecular weight of the polymer was determined to be 9,500 on a polyethylene glycol-equivalent basis.

<Synthesis Example of Polymer (CA-1)>

Under nitrogen atmosphere, 8.5 g of 2-phosphonooxyethyl methacrylate and 0.1 g of azobisisobutyronitrile were dissolved in 17 g of methyl ethyl ketone, and the resulting solution was stirred at 80° C. for 12 hours. The polymer solution obtained was cooled and then added to 170 g of 1,2-dichloroethane. This was followed by decantation to collect the polymer formed as a precipitate. Subsequently, the polymer was dissolved in tetrahydrofuran, and the solution was subjected to purification by reprecipitation using 1,2-dichloroethane as a poor solvent. The purification by reprecipitation was repeated three times, followed by vacuum drying at 50° C. for 24 hours to obtain a polymer (CA-1) which is different from the polymer (A). The polymer (CA-1) was a polymer of 2-phosphonooxyethyl methacrylate. As a result of GPC analysis, the number average molecular weight of the polymer was determined to be 10,000 on a polystyrene-equivalent basis.

<Production Example of Coating Liquid (S-1)>

The polymer (A-1) obtained in the above synthesis example was dissolved in a mixed solvent of water and methanol (at a mass ratio, water:methanol, of 7:3) to obtain a coating liquid (S-1) having a solids concentration of 1 mass %.

\<Production Example of Coating Liquid (S-2)\>

A coating liquid (S-2) was obtained in the same manner as in the production of the coating liquid (S-1), except for substituting the polymer (A-2) for the polymer (A-1).

\<Production Example of Coating Liquid (S-3)\>

A mixture containing 65 mass % of the polymer (A-1) obtained in the above synthesis example and 35 mass % of polyvinyl alcohol (PVA 124, manufactured by KURARAY CO., LTD.; degree of saponification=98.5 mol %, viscosity-average degree of polymerization=2,400, viscosity of 4 mass % aqueous solution at 20° C.=60 mPa·s) was prepared. This mixture was dissolved in a mixed solvent of water and methanol (at a mass ratio, water:methanol, of 7:3) to obtain a coating liquid (S-3) having a solids concentration of 1 mass %.

\<Production Example of Coating Liquid (S-4)\>

A mixture containing 80 mass % of the polymer (A-1) obtained in the above synthesis example and 20 mass % of polyvinyl alcohol (PVA 124, manufactured by KURARAY CO., LTD.; degree of saponification=98.5 mol %, viscosity-average degree of polymerization=2,400, viscosity of 4 mass % aqueous solution at 20° C.=60 mPa·s) was prepared. This mixture was dissolved in a mixed solvent of water and methanol (at a mass ratio, water : methanol, of 7:3) to obtain a coating liquid (S-4) having a solids concentration of 1 mass %.

\<Production Example of Coating Liquid (CS-1)\>

A coating liquid (CS-1) was obtained in the same manner as in the production of the coating liquid (S-1), except for substituting the polymer (CA-1) for the polymer (A-1).

Example 1

First, an oriented polyethylene terephthalate film "Lumirror (registered trademark) P60" manufactured by Toray Industries, Inc. with a thickness of 12 µm (hereinafter also referred to as "PET 12") was prepared as the base (X). The coating liquid (T-1) was applied onto this base using a bar coater in such a manner that the dry thickness would be 0.3 µm. The applied film was dried at 110° C. for 5 minutes and then heat-treated at 160° C. for 1 minute to form the layer (Z1) on the base. A structure having a configuration of "base (X)/layer (Z1)" was thus obtained. As a result of measurement of the infrared absorption spectrum of the obtained structure, the maximum absorption wavenumber in the region of 800 to 1,400 $cm^{-1}$ was determined to be 1,108 $cm^{-1}$, and the half width of the maximum absorption band was determined to be 37 $cm^{-1}$. Subsequently, the coating liquid (S-1) was applied onto the structure using a bar coater in such a manner that the dry thickness would be 0.05 µm, and then was dried at 220° C. for 1 minute to form the layer (Y). A multilayer structure (1-1) having a configuration of "base (X)/layer (Z1)/layer (Y)" was thus obtained.

The oxygen transmission rate and moisture permeability of the multilayer structure (1-1) thus obtained were measured by the methods described above. The surface electrical resistivity of the layer (Y) in the multilayer structure (1-1) thus obtained was measured by the method described above.

Example 2

A multilayer structure (2-1) was fabricated in the same manner as in the fabrication of the multilayer structure (1-1) of Example 1, except for substituting the coating liquid (S-2) for the coating liquid (S-1).

Example 3

A multilayer structure (3-1) was fabricated in the same manner as in the fabrication of the multilayer structure (1-1) of Example 1, except for applying the coating liquid (S-3) instead of the coating liquid (S-1) in such a manner that the dry thickness of the layer (Y) would be 0.01 µm.

Example 4

A multilayer structure (4-1) was fabricated in the same manner as in the fabrication of the multilayer structure (1-1) of Example 1, except for forming a layer (Z3) of aluminum oxide with a thickness of 0.03 µm by vacuum deposition instead of the layer (Z1).

Example 5

The layer (Z3) of aluminum oxide with a thickness of 0.03 µm was formed on the PET 12 of the base (X) by vacuum deposition. Next, the layer (Z1) was formed on the layer (Z3) using the coating liquid (T-1) in the same manner as in Example 1. Subsequently, the layer (Y) was formed on the layer (Z1) using the coating liquid (S-1) in the same manner as in Example 1. In this way, a multilayer structure (5-1) having a configuration of "base (X)/layer (Z3)/layer (Z1)/layer (Y)" was fabricated.

Example 6

The layer (Z1) was formed on the PET 12 of the base (X) using the coating liquid (T-1) in the same manner as in Example 1. Next, the layer (Z3) of aluminum oxide with a thickness of 0.03 µm was formed on the layer (Z1) by vacuum deposition. Subsequently, the layer (Y) was formed on the layer (Z3) using the coating liquid (S-1) in the same manner as in Example 1. In this way, a multilayer structure (6-1) having a configuration of "base (X)/layer (Z1)/layer (Z3)/layer (Y)" was fabricated.

Example 7

A multilayer structure (7-1) was fabricated in the same manner as in the fabrication of the multilayer structure (1-1) of Example 1, except for applying the coating liquid (S-4) instead of the coating liquid (S-1) in such a manner that the dry thickness of the layer (Y) would be 0.01 µm.

Comparative Examples 1 to 3

In Comparative Example 1, a multilayer structure (C1-1) was fabricated in the same manner as in the fabrication of the multilayer structure (1-1) of Example 1, except that the coating liquid (S-1) was not used. In Comparative Example 2, a multilayer structure (C2-1) having a configuration of "base (X)/layer (Z1)/layer (CY)" was fabricated in the same manner as in the fabrication of the multilayer structure (1-1) of Example 1, except for substituting the coating liquid (CS-1) for the coating liquid (S-1). In Comparative Example 3, a multilayer structure (C3-1) was fabricated in the same manner as in the fabrication of the multilayer structure (4-1) of Example 4, except that the coating liquid (S-1) was not used.

The conditions of production of the multilayer structures of Examples and Comparative Examples are shown in Table 1. In the table, "A:B" represents "polymer (A):polymer (B)".

TABLE 1

| | Multilayer structure | | Layer (Y) | | | | |
|---|---|---|---|---|---|---|---|
| | | Coating | | Composition of coating liquid (S) | | | |
| | No. | Layer configuration | liquid (S) No. | Thickness [μm] | Polymer (A) | Polymer (B) | A:B (mass ratio) |
| Example 1 | 1-1 | (X)/(Z1)/(Y) | S-1 | 0.05 | A-1 | — | — |
| Example 2 | 2-1 | (X)/(Z1)/(Y) | S-2 | 0.05 | A-2 | — | — |
| Example 3 | 3-1 | (X)/(Z1)/(Y) | S-3 | 0.01 | A-1 | PVA | 65:35 |
| Example 4 | 4-1 | (X)/(Z3)/(Y) | S-1 | 0.05 | A-1 | — | — |
| Example 5 | 5-1 | (X)/(Z3)/(Z1)/(Y) | S-1 | 0.05 | A-1 | — | — |
| Example 6 | 6-1 | (X)/(Z1)/(Z3)/(Y) | S-1 | 0.05 | A-1 | — | — |
| Example 7 | 7-1 | (X)/(Z1)/(Y) | S-4 | 0.01 | A-1 | PVA | 80:20 |
| Comparative Example 1 | C1-1 | (X)/(Z1) | — | — | — | — | — |
| Comparative Example 2 | C2-1 | (X)/(Z1)/(CY) | CS-1 | 0.05 | CA-1 | — | — |
| Comparative Example 3 | C3-1 | (X)/(Z3) | — | — | — | — | — |

The multilayer structures (2-1) to (7-1) of Examples and the multilayer structures (C1-1) to (C3-1) of Comparative Examples were evaluated in the same manner as in the evaluation of the multilayer structure (1-1). The results of evaluation of the multilayer structures are shown in Table2.

TABLE 2

| | Oxygen transmission rate [mL/(m$^2$ · day · atm)] | Moisture permeability [g/(m$^2$ · day)] | Surface electrical resistivity [Ω/sq] | Adhesion of dust |
|---|---|---|---|---|
| Example 1 | 0.2 | 0.2 | 3.83 × 10$^9$ | A |
| Example 2 | 0.2 | 0.2 | 6.14 × 10$^{10}$ | A |
| Example 3 | 0.2 | 0.2 | 3.73 × 10$^{13}$ | B |
| Example 4 | 0.8 | 0.3 | 4.88 × 10$^9$ | A |
| Example 5 | 0.2 | 0.2 | 5.94 × 10$^9$ | A |
| Example 6 | 0.2 | 0.2 | 3.39 × 10$^9$ | A |
| Example 7 | 0.2 | 0.2 | 4.20 × 10$^{12}$ | B |
| Comparative Example 1 | 0.2 | 0.2 | 1.59 × 10$^{15}$ | C |
| Comparative Example 2 | 0.2 | 0.2 | 1.23 × 10$^{16}$ | C |
| Comparative Example 3 | 0.8 | 0.3 | 8.53 × 10$^{13}$ | C |

As shown in Table 2 above, the antistatic sheets of the present invention had low surface electrical resistivities. Therefore, the antistatic sheets of the present invention exhibited high antistatic performance and thus the amount of dust adhered thereto due to static electricity was significantly reduced.

Example 8

An adhesive layer was formed on the obtained multilayer structure (1-1), and then a linear short-chain branched polyethylene (also known as "linear low density polyethylene" (LLDPE)) film (with a thickness of 50 μm) was laminated onto the adhesive layer. The resulting laminate was allowed to stand at 40° C. for 5 days for aging. In this way, a multilayer structure (1-2) having a configuration of "base (X)/layer (Z1)/layer (Y)/adhesive layer/linear short-chain branched polyethylene film" was obtained. "UNILAX LS-711C" (product name) manufactured by Idemitsu Unitech Co., Ltd. was used as the linear short-chain branched polyethylene film. The above adhesive layer was formed by applying a two-component adhesive using a bar coater in such a manner that the dry thickness would be 3 μm and then by drying the applied adhesive. The two-component adhesive used was a two-component reactive polyurethane adhesive composed of "A-520" (product name) of "TAKELAC" (registered trademark) manufactured by Mitsui Chemicals, Inc. and "A-50" (product name) of "TAKENATE" (registered trademark) manufactured by Mitsui Chemicals, Inc.

The multilayer structure (1-2) was cut into a 100-mm-wide piece, which was fed to a vertical form-fill-seal packaging machine (manufactured by ORIHIRO Co., Ltd.) in such a manner that the heat sealing was performed with the linear short-chain branched polyethylene film layers being in contact with each other. Using the vertical form-fill-seal packaging machine, a vertical form-fill-seal bag (3-1) of the fin seal type (having a width of 40 mm and a length of 120 mm) was fabricated. The adhesion of dust to the inner surface of the vertical form-fill-seal bag (1-3) was evaluated. The result is shown in Table 3.

Examples 9 to 14

Vertical form-fill-seal bags (2-3) to (7-3) were fabricated in the same manner as in Example 8, except for using the multilayer structures (2-1) to (7-1) instead of the multilayer structure (1-1) of Example 8, and were subjected to evaluation of the adhesion of dust to the inner surfaces thereof. The results are shown in Table 3.

Comparative Examples 4 to 6

Vertical form-fill-seal bags (C1-3) to (C3-3) were fabricated in the same manner as in Example 8, except for using the multilayer structures (C1-1) to (C3-1) instead of the multilayer structure (1-1) of Example 8, and were subjected to evaluation of the adhesion of dust to the inner surfaces thereof. The results are shown in Table 3.

TABLE 3

| | Multilayer structure configuration | Base (X) Type | Base (X) Thickness μm | Layer (Z) / Layer (Z1) Coating liquid (T) No. | Layer (Z) / Layer (Z1) Coating Thickness μm | Layer (Z) / Layer (Z3) Vapor deposition | Layer (Z) / Layer (Z3) Thickness μm | Layer (Y) Coating liquid (S) No. | Layer (Y) Thickness μm | Layer (Y) Composition of coating liquid (S) Polymer (A) | Layer (Y) Composition of coating liquid (S) Polymer (B) | Layer (Y) Composition of coating liquid (S) A:B (mass ratio) | Vertical form-fill-seal bag No. | Adhesion of dust |
|---|---|---|---|---|---|---|---|---|---|---|---|---|---|---|
| Ex. 8 | (X)/(Z1)/(Y) | PET | 12 | T-1 | 0.3 | — | — | S-1 | 0.05 | A-1 | — | — | 1-3 | A |
| Ex. 9 | (X)/(Z1)/(Y) | PET | 12 | T-1 | 0.3 | — | — | S-2 | 0.05 | A-2 | — | — | 2-3 | B |
| Ex. 10 | (X)/(Z1)/(Y) | PET | 12 | T-1 | 0.3 | — | — | S-3 | 0.01 | A-1 | PVA | 65:35 | 3-3 | B |
| Ex. 11 | (X)/(Z3)/(Y) | PET | 12 | — | — | $Al_2O_3$ | 0.03 | S-1 | 0.05 | A-1 | — | — | 4-3 | B |
| Ex. 12 | (X)/(Z3)/(Z1)/(Y) | PET | 12 | T-1 | 0.3 | $Al_2O_3$ | 0.03 | S-1 | 0.05 | A-1 | — | — | 5-3 | B |
| Ex. 13 | (X)/(Z1)/(Z3)/(Y) | PET | 12 | T-1 | 0.3 | $Al_2O_3$ | 0.03 | S-1 | 0.05 | A-1 | — | — | 6-3 | A |
| Ex. 14 | (X)/(Z1)/(Y) | PET | 12 | T-1 | 0.3 | — | — | S-4 | 0.01 | A-1 | PVA | 80:20 | 7-3 | B |
| Com. Ex. 4 | (X)/(Z1) | PET | 12 | T-1 | 0.3 | — | — | — | — | — | — | — | C1-3 | C |
| Com. Ex. 5 | (X)/(Z1)/(CY) | PET | 12 | T-1 | 0.3 | — | — | CS-1 | 0.05 | CA-1 | — | — | C2-3 | C |
| Com. Ex. 6 | (X)/(Z3) | PET | 12 | — | — | $Al_2O_3$ | 0.03 | — | — | — | — | — | C3-3 | C |

[Abbreviation in table]
PVA: polyvinyl alcohol

As shown in Table 3 above, the antistatic sheets including the multilayer structures of the present invention exhibited high antistatic performance and thus the amount of dust adhered thereto due to static electricity was significantly reduced.

INDUSTRIAL APPLICABILITY

The present invention is applicable to an antistatic sheet, and a packaging material and an electronic device that include the antistatic sheet. According to the present invention, it is possible to obtain an antistatic sheet having high gas barrier performance and water vapor barrier performance and high antistatic performance. Therefore, the antistatic sheet of the present invention can be preferably used as or in packaging materials for foods, chemicals, medical instruments, industrial materials, electronic equipment, etc. The antistatic sheet of the present invention can be preferably used as or in display members such as a substrate film for liquid crystal displays, a substrate film for organic EL devices, a substrate film for electronic paper, a sealing film for electronic devices, and a film for plasma display panels; electronic device-related members, including: a film for LEDs; a film for IC tags; a solar cell module; and solar cell members such as a back sheet for solar cells and a protective film for solar cells; and electronic devices such as a member for optical communication, a flexible film for electronic equipment; a barrier membrane for fuel cells; a sealing film for fuel cells; and a substrate film for various functional films

DESCRIPTION OF REFERENCE NUMERALS

10 Vertical form-fill-seal bag
11 Multilayer structure
11a Edge portion
11b Body portion
11c Edge
20 Flat pouch
30 Vacuum insulator
31 Core material
40 Electronic device
41 Electronic device body
42 Sealing material
43 Protective sheet (multilayer structure)

The invention claimed is:

1. An antistatic sheet, comprising
a multilayer structure comprising: a base (X); a layer (Z) containing an aluminum atom; and a layer (Y), wherein
the layer (Y) contains a polymer (A) comprising a phosphonic acid unit, and
the layer (Y) has a surface electrical resistivity of $1.0 \times 10^6$ Ω/sq or more and $4.0 \times 10^{13}$ Ω/sq or less.

2. The antistatic sheet according to claim 1, wherein the polymer (A) is a polymer (Aa) comprising a vinylphosphonic acid unit.

3. The antistatic sheet according to claim 1, wherein the multilayer structure comprises at least one pair of the layer (Z) and the layer (Y) that are disposed contiguous to each other.

4. The antistatic sheet according to claim 1, wherein
the layer (Z) comprises a layer (Z1) containing a reaction product (E),
the reaction product (E) is formed by a reaction between a metal oxide (C) containing an aluminum atom and a phosphorus compound (D), and
in an infrared absorption spectrum of the layer (Z1), a maximum absorption wavenumber in a region of 800 to 1,400 $cm^{-1}$ is 1,080 to 1,130 $cm^{-1}$.

5. The antistatic sheet according to claim 1, wherein the layer (Z) comprises a deposited layer (Z3) of aluminum oxide.

6. The antistatic sheet according to claim 1, having an oxygen transmission rate of 2 mL/($m^2$·day·atm) or less at 20° C. and 85% RH.

7. A packaging material, comprising the antistatic sheet according to claim 1.

8. An electronic device, comprising the antistatic sheet according to claim 1.

* * * * *